3,546,203
NON-METALLIZABLE ARYLAZOAMINONAPH-
THALENE SULPHONAMIDE OR SULPHONIC
ACID ARYL ESTER DYESTUFFS
Werner Bossard and Hans E. Wegmuller, Riehen, Switzerland, assignors to J. R. Geigy A.G., Basel, Switzerland
No Drawing. Application Ser. No. 547,730, May 5, 1966, which is a continuation-in-part of applications Ser. No. 193,306, May 8, 1962, Ser. No. 225,844, Sept. 24, 1962, and Ser. No. 300,640, Aug. 7, 1963, as a continuation-in-part of application Ser. No. 193,306, and Ser. No. 433,796, Feb. 18, 1965, as a continuation-in-part of application Ser. No. 225,844. This application June 6, 1967, Ser. No. 663,464
Claims priority, application Switzerland, May 9, 1961, 5,453/61; Mar. 26, 1962, 3,691/62, 3,693/62
Int. Cl. D06p 1/04, 1/08; C09b 29/06
U.S. Cl. 260—196                         8 Claims

ABSTRACT OF THE DISCLOSURE

Non-metallizable phenylazonaphthalene dyestuffs, free from sulfonic acid and carboxylic acid radicals are described. The dyestuffs are characterized by having (a) in the 1-position of the naphthalene nucleus a nitro- or cyano-substituted benzeneazo radical optionally containing further substituents, (b) in the 2-position of the naphthalene nucleus an unsubstituted amino group, and (c) in one of the 3-, 4-, 5-, 6-, 7- or 8-positions of the naphthalene nucleus an amino- or substituted aminosulphonyl group, a phenoxy or substituted phenoxy sulphonyl group, a naphthyl-(1)-oxy sulphonyl group, a naphthyl-(2)-oxy sulphonyl group, a pyridyl-(3)-oxy sulphonyl group, a morpholinyl-(1)-sulphonyl group or a piperidyl-(1)-sulphonyl group. The said dyestuffs are suitable for the dyeing of polyesters, and particularly polyethylene glycol terephthalate fibers, the dyeing produced being distinguished by outstanding fastness to sublimation and light.

This application is a divisional application of our application Ser. No. 547,730, now abandoned, filed May 5, 1966 as a continuation-in-part of our applications Ser. No. 193,306 filed on May 8, 1962, now abandoned, Ser. No. 225,844 filed Sept. 24, 1962, now abandoned, Ser. No. 300,640 filed Aug. 7, 1963, and now abandoned as a continuation-in-part of Ser. No. 193,306, and Ser. No. 433,796 filed Feb. 18, 1965, and now abandoned as a continuation-in-part of Ser. No. 225,844, now abandoned.

This invention relates to a new class of dyes which are specifically suited for the dyeing of polyester and particularly for polyethylene glycol terephthalate fibers and to the dyeings on said fibers which are distinguished by outstanding fastness to sublimation and light.

The dyeing of polyethylene glycol terephthalate fibers among which there are such well-known fibers as Dacron, Terylene, Tergal, Diolen, Trivira and Kodel, presents special problems due to the fact that dyed fabrics made from these fibers are usually subjected to a process by which they are permanently pleated. Permanent pleats are applied to dyed fabrics of these fibers by pressing the fabric between two steel plates with simultaneous heating to about 180° C. for a brief period. It is, therefore, necessary that the dyeings subjected to this treatment are fast to sublimation at the aforementioned elevated temperature range; otherwise, the pleated edge will be seriously discolored.

Dyeings of the said fibers in orange to violet shades have hitherto often lacked the necessary fastness to sublimation and, frequently, also failed in fastness to light.

It is, therefore, an object of our invention to provide dyestuffs which dye polyethylene glycol terephthalate fibers in orange to violet shades with good to outstanding fastness to light and to sublimation.

We have found that, surprisingly, this object and others which will become apparent in the description of the invention given hereinafter, are attained by the novel metal free monoazo dyestuffs according to a first aspect of the invention, which are difficultly soluble in water and which are of the formula

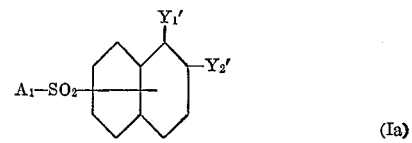

(Ia)

wherein $A_1$ is one of the following radicals:

(a) The amino group; (b) a substituted amino group having 1 or 2 nitrogen substituents which are, independently of each other, alkyl with from 1 to preferably not more than 10 carbon atoms, hydroxy-lower alkyl groups, lower alkoxy-lower alkyl, lower alkanolyoxy-lower alkyl, or a substituted amino group wherein one of the bonds of the amino nitrogen is occupied by hydrogen or one of the aforesaid substituents, while another bond is occupied by benzoyloxy-lower alkyl, cycloalkyl with six ring carbon atoms, preferably cyclohexyl, benzyl, phenyl, lower alkyl-phenyl, lower alkoxy-phenyl, chlorophenyl or bromo-phenyl; (c) unsubstituted phenoxy or phenoxy substituted by lower alkyl, phenyl, lower alkoxy, hydroxy-lower alkoxy, phenoxy, lower alkoxy carbonyl, carbamyl, sulfamyl, carbamyl which is N-mono- or N,N-di-substituted with lower alkyl, hydroxy-lower alkyl or lower alkoxy-lower alkyl, sulfamyl which is N-mono- or N,N-di-substituted with lower alkyl, hydroxy-lower alkyl, or lower alkoxy-lower alkyl, or phenoxy substituted with N,N-di-lower alkyl-amino, lower alkanoyl-amino, chlorine or bromine; or (d) naphthyl-(1)-oxy or naphthyl-(2)-oxy; or (e) pyridyl-(3)-oxy, morpholinyl-(1) or piperidyl-(1); and of $Y_1'$ and $Y_2'$, one is an aryl azo radical of the formula

wherein B' is phenyl, alkylphenyl with an alkyl moiety of 1 to not more than 8 carbon atoms, lower alkoxyphenyl, chlorophenyl, bromophenyl, fluorophenyl, cyanophenyl, nitrophenyl, trimethylfluorophenyl, lower alkanoyl-phenyl, lower alkoxycarbonyl-phenyl, phenyloxy-carbonylphenyl, benzyloxy-carbonyl-phenyl, lower alkanoylamino-phenyl, chloro- or bromo-lower alkanoylaminophenyl, naphthyl-(1) or naphthyl-(2) and also chlorotriazinylamino-phenyl or chloropyrimidylamino-phenyl; and the other Y′ is a —NH$_2$, lower alkyl—NH—, hydroxy-lower alkyl—NH—, lower alkoxy-lower alkyl—NH—, phenyl—NH— or a lower alkylphenyl—NH— radical, the dyestuffs of Formula Ia being free from water-solubilizing groups that dissociate acid in water.

"Lower" when used in connectoin with an aliphatic radical means that said radical has from 1-4 carbon atoms.

The dyestuffs of Formula Ia are generally also suited for the dyeing of such other fibers as cellulose acetate fibers, polyamide fibers or polyacrylonitrile and the like synthetic fibers on an industrial scale. Particularly unexpected is the fact that presence of one substituent A$_1$—SO$_2$— as defined above, in the dyestuffs according to the invention, decisively improves the fastness to sublimation and, particularly to light, of the dyeings produced by these dyestuffs on polyester fibers.

Their outstanding, specific dyeing properties on polyester fibers and particularly the fastness to sublimation and to light of their dyeings on polyester fibers distinguish them from azo dyes of similar structure which possess an —SO$_3$H group instead of the group —SO$_2$—A$_1$ for such known —SO$_3$H groups-containing monoazo dyes show practically no affinity to polyester fibers, and also from monoazo dyes of similar solution which have neither —SO$_3$—A nor —SO$_3$H substituents, for dyeings, of such dyestuffs on polyester fibers lack fastness to sublimation and light and are therefore not applicable in commercial dyeing of polyester fibers.

The dyestuffs of Formula Ia as well as similar dyestuffs which fall under the formula

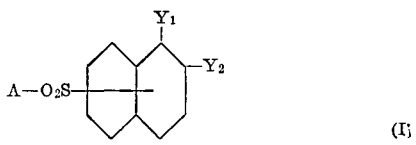

(I)

are obtained by coupling a diazonium compound of the homocyclic or heterocyclic series with a compound of formula

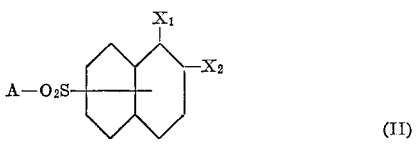

(II)

which couples in o-position to the primary or to a secondary amino group, the components being so chosen that the dyestuff does not contain any water solubilising groups which dissociate acid in water.

In the Formulae I and II: of Y$_1$ and Y$_2$, one Y is an arylazo group having a homocyclic or heterocyclic aryl radical and containing no water solubilising groups which dissociate acid in water, the other Y is the primary or a secondary amino group; A represents a possibly ring-substituted aryloxy group or an

group in which R$_1$ is hydrogen, a possibly substituted alkyl, cycloalkyl, aralkyl or aryl group, and R$_2$ is hydrogen, a possibly substituted alkyl, cycloalkyl or aralkyl group, and R$_1$ and R$_2$ together with the aminonitrogen atom also form a heterocyclic ring; and of X$_1$ and X$_2$, one X is hydrogen or a substituent which can be replaced by the diazo group and the other X is the primary or secondary amino group.

In 2-aminonaphthalene sulphonyl compounds of Formula I, a substituent which can be replaced by the diazo group is a 1-sulphonic acid group.

As carbocyclic diazonium compounds, those of the naphthalene and, preferably, of the benzene series are used. Heterocyclic diazonium compounds are principally 5-membered, or also 6-membered heterocyclic compounds, in particular those containing nitrogen and possibly fused rings.

As defined, diazonium compounds usable according to the invention should not contain any substituents which dissociate acid in water such as sulphonic acid or carboxylic acid groups. Otherwise their carbocyclic and heterocyclic radicals can be mono- or poly-substituted as desired, for example by hydrocarbon groups such as methyl, ethyl, isopropyl, tert. amyl, cyclohexyl, isooctyl, phenyl, benzyl groups; by ether groups such as methoxy, ethoxy, phenoxy groups; by acylamino groups such as acetylamino, chloroacetylamino, β-chloropropionylamino, benzoylamino, chlorobenzoylamino groups; by chlorotriazinylamino and chloropyrimidylamino groups, particularly, however, by electrophilic substituents such as the nitro group, the trifluoromethyl group, the cyano group, halogens such as fluorine, chlorine and bromine, keto groups, ester groups such as the carbomethoxy, carboethoxy, carboxyisopropoxy, carbobutoxy, carbocyclohexyloxy, carbophenyloxy and carbobenzyloxy group.

Preferably diazonium compounds of the benzene series are used which contain at least one electrophilic substituent in the o- and/or p-position to the diazonium group.

Diazonium compounds usable according to the invention of the carbocyclic or heterocyclic series are derived, for example, from the following amines: 1-amino-2-nitrobenzene, 1 - amino - 2 - nitro-4-methylbenzene, 1-amino-2-nitro - 4 - methoxy or -4-ethoxy- benzene, 1-amino-2-nitro - 4 - chlorobenzene, 1-amino-2-nitro-4-trifluoromethylbenzene, 1 - amino - 4 - nitrobenzene, 1 - amino-4 - nitro - 2 - methylbenzene, 1 - amino - 4 - nitro-2-methoxy- or -2-ethoxy- benzene, 1 - amino - 4 - nitro-2-chloro- or -2 - bromobenzene, 1 - amino - 4 - nitro - 2-cyanobenzene, 1-amino - 4 - nitro - 2,5 - dichlorobenzene, 1-amino - 4 - nitro - 2,6 - dichloro- or -2,6 - dibromobenzene, 1 - amino - 4 - nitro - 3 - carboxyethoxy- or -3-carboxybutoxybenzene, 1 - amino - 2,4 - dinitrobenzene, 1 - amino - 2,4 - dinitro - 6 - chlorobenzene, 1-amino-4-carboxyethoxy, or -4-carboxyphenyloxybenzene, 1-amino-2, 4-, -2,5-, or -3,4-dicyanobenzene, 1- or 2-aminonaphthalene, 2 - aminothiophene - 5 - sulphonic acid methyl or ethyl amide, 2 - aminothiadiazole, 2 - amino - 5 - nitrothiazole, 2 - amino - 6 - methoxybenzthiazole or 3-aminoindazole.

If X$_1$ is the primary or a secondary amino group, the 1-aminonaphthalene - 3 - sulphonyl and 1 - aminonaphthalene-4-sulphonyl compounds are used as coupling components.

Preferred coupling components however, are those in which X$_1$ is hydrogen and X$_2$ is the primary or a secondary amino group. Examples of a secondary amino group are the methylamino, ethylamino, propylamino, butylamino, cyanoethylamino, hydroxyethylamino, methoxyethylamino, ethoxyethylamino, cyclohexylamino, benzylamino, phenylamino or tolylamino group; advantageously X$_2$ is the primary amino group.

In 2-aminonaphthalene sulphonyl compounds, the sulphonyl group —SO$_2$A can be in the 3-, 4-, 5-, 6-, 7- or 8-position of the naphthalene nucleus. Those dyestuffs which are produced by coupling diazonium compounds usable according to the invention with 2-aminonaphthalene-4-sulphonyl, 2-aminonaphthalene-5-sulphonyl and 2-aminonaphthalene-6-sulphonyl compounds have a surprisingly good affinity to hydrophobic polyester fibres.

The same dyestuffs are obtained by coupling diazonium compounds usable according to the invention with the corresponding 2-aminonaphthalene sulphonyl-1-sulphonic acids.

These coupling components in which —SO₂A is sulphonic acid aryl ester are obtained, for example, by reacting suitable acylaminonaphthalene sulphonic acids such as carbobenzyloxyaminonaphthalene sulphonic acids with phosphorus oxychloride to form the corresponding sulphonic acid chlorides, condensing these with the desired hydroxyaryl compound to form the corresponding aryl ester and removing the acyl group by hydrogenolysis.

The aryloxy group possibly ring-substituted corresponding to A is derived, for example, from hydroxybenzene, from an alkyl, alkoxy, aryloxy, halogen or tert. amino hydroxybenzene or from a hydroxynaphthalene; thus, for example, from 2-, 3- or 4-methyl- or 2-, 3- or 4-ethyl-1-hydroxybenzene or technical mixtures thereof, from 2,4-dimethyl-, 4-tert. butyl- or 4-isooctyl-1-hydroxybenzene, from 2-, 3-, or 4-chloro-1-hydroxybenzene or from 2-, 3- or 4-methoxy- or 2-, 3-, or 4-ethoxy-1-hydroxybenzene, also from 3-dimethylamino- or 3-diethylamino-1-hydroxybenzene, from 2- or 4-carbomethoxy-, 2- or 4-carboethoxy- or 2- or 4-carbobutoxy-1-hydroxybenzene, from 4-hydroxydiphenyl ether or from 1- or 2-hydroxynaphthalene.

Coupling components usable according to the invention in which —SO₂A represents sulphonic acid amides are obtained, for example, by reacting suitable acylaminonaphthalene sulphonic acids with phosphorus oxychloride to form the corresponding sulphonic acid chlorides and condensing these with ammonia or with primary or secondary amines and saponification of the acylamide groups.

The amide group corresponding to A can contain primary, secondary or tertiary nitrogen; as nitrogen substituents it can contain, for example, methyl, ethyl, propyl, butyl, cyclohexyl, phenyl, tolyl, benzyl, hydroxyethyl, cyanoethyl, methoxyethyl and methoxypropyl groups in an combination desired. They are derived, for example, from amines such as ammonia, monolkylamines such as methylamine, ethylamine, propylamine, isopropylamine, n-, sec- or tert. butylamine, octylamine or decylamine, hydroxyalkylamines such as β-hydroxyethylamine or γ-hydroxypropylamine, alkoxyalkylamines such as β-methoxyethylamine or β-ethoxyethylamine, γ-methoxypropylamine, γ-ethoxypropylamine or γ-phenoxypropylamine, aralkylamines such as benzylamine, arylamines, e.g. phenylamine or a methyl-, methoxy- or ethoxy-phenylamine, also dialkylamines, e.g. dimethylamine, diethylamine, dipropylamine, dibutylamine, di-(β-hydroxyethyl)-amine or N-methyl-N-β-hydroxyethylamine, N-alkyl - N - aralkylamines such as N-methyl-N-benzylamine or N-alkyl-N-arylamines such as N-methyl-N-phenylamine, N-ethyl-N-phenylamine or N-β-hydroxyethyl-N-phenylamine or cyclic secondary amines such as piperidine, piperazine or morpholine.

The coupling is advantageously performed in mineral acid to weakly acid aqueous solution, preferably with gradual buffering of the mineral acid for example with alkali metal salts of low fatty acids. If desired, a suitable diazonium compound can also be coupled simultaneously with a mixture of two or more coupling components usable according to the invention or a mixture of two suitable diazo components can be simultaneously coupled with one or more coupling components usable according to the invention.

A modification of the process for the production of azo dyestuffs according to the invention of Formula I

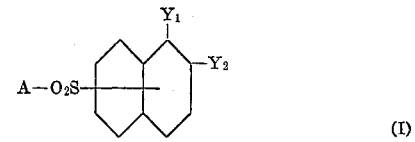

wherein of $Y_1$ and $Y_2$ one Y is an arylazo group having a homocyclic or heterocyclic aryl radical and containing no water solubilising groups which dissociate acid in water, the other Y is the primary or a secondary amino group; and A is a possibly ring-substituted aryloxy group or a group

in which $R_1$ is hydrogen, a possibly substituted alkyl, cycloalkyl, aralkyl or aryl group and $R_2$ is hydrogen, a possibly substituted alkyl, cycloalkyl or aralkyl group and $R_1$ and $R_2$ together with the aminonitrogen atom also form a heterocyclic ring, consists in reacting an arylazonaphthalene compound of Formula III

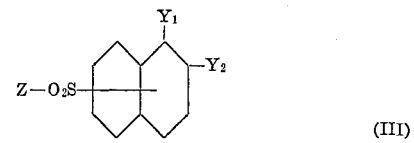

wherein $Y_1$ and $Y_2$ have the meanings given in Formula I and Z represents chlorine or bromine, with a possibly ring-substituted hydroxyaryl compound or with an amine of Formula IV

wherein $R_1$ is hydrogen, a possibly substituted alkyl, cycloalkyl, aralkyl or aryl group; and $R_2$ is hydrogen or a possibly substituted alkyl, cyclo-alkyl or aralkyl group and $R_1$ and $R_2$ together with the aminonitrogen atom also form a heterocyclic ring. The diazo components mentioned in the first process discussed above are also suitable for the second process and the aminonaphthalene sulphonic acids used for the production of starting materials of the general Formula III can be used as coupling components.

The arylazonaphthalene compounds of Formula III usable according to the invention are obtained, for example, by coupling an aryldiazonium compound of the homocyclic or heterocyclic series with an aminonaphthalene sulphonic acid coupling in a position adjacent to a primary or secondary amino group, such as 1-aminonaphthalene-3- or -4-sulphonic acid or 2-aminonaphthalene-3-, -4-, -5-, -6-, -7- or 8- sulphonic acid, and converting the azo dyestuff sulphonic acid so obtained into the corresponding sulphonic acid chloride or bromide, for example with a phosphorus chloride or bromide, possibly in the presence of a tertiary nitrogen base.

As examples of possibly ring-substituted hydroxyaryl compounds or their salts, or of ammonia, primary or secondary amines which are to be reacted with the azo dyestuff sulphonic acid chlorides or bromides of Formula III are those given in the description of A above.

The sulphonic acid halides of Formula III are condensed with the hydroxyaryl compounds to form arylesters or with the amines of Formula IV to form amides advantageously at raised temperature, possibly in aqueous, organic or in aqueous-organic solution. Suitable organic solvents therefor are those miscible with water, e.g., low aliphatic ketones such as acetone or methylethyl ketone or ether alcohols such as ethylene glycol monomethyl or monoethyl ether, or those not miscible with water, e.g. possibly halogenated aromatic hydrocarbons such as benzene, toluene, xylenes, chlorobenzene, or dichlorobenzenes. The hydroxyaryl compounds to be reacted are used advantageously in the form of their water soluble salts such as the sodium or potassium salts. When amines are used, the reaction is performed advantageously in the presence of an acid binding agent, for example, in an excess of the amine used, or in the presence of an alkali metal salt of carbonic acid such as sodium carbonate.

A preferred group of dyestuffs according to this invention corresponds to the formula

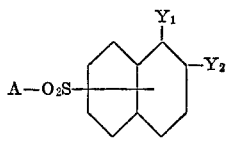

wherein one of $Y_1$ and $Y_2$ is the primary amino ($-NH_2$) or the secondary amino group and the other $Y_1$ and $Y_2$ is the $-N=N-B$ group, wherein B is a radical of the benzene or naphthalene series, e.g. naphthyl radical or preferably a substituted phenyl radical; and A is an at most bicyclic carbocyclic aryloxy radical or

wherein $R_1$ is hydrogen, alkyl, especially an alkyl having 1 to 8 carbon atoms, hydroxy(lower)-alkyl, especially β-hydroxyethyl, (lower)alkoxy(lower)-alkyl, cyclohexyl, benzyl or mononuclear aryl, especially phenyl, methoxyphenyl or methylphenyl, and $R_2$ is hydrogen, lower alkyl or hydroxy(lower)alkyl, especially β-hydroxyethyl, and $R_1$ and $R_2$ together with the adjacent nitrogen is a six-membered saturated heterocyclic nucleus, particularly a piperidine, a piperazine or a morpholine nucleus.

If one of $Y_1$ and $Y_2$ is a secondary amino group, then it is preferably $-NH-$lower alkyl, e.g. $-NH-CH_3$, $-NH-C_2H_5$, $-NH-C_3H_7$, $-NH-C_4H_9$, $-NH-$ hydroxy(lower)alkyl, e.g. $-NH-CH_2CH_2OH$, $-NH-$ monocyclic aryl, e.g. $-NH-C_6H_5$ or $-NH-C_6H_4CH_3$.

If A in the above formula is an aryloxy radical then it is particularly either an unsubstituted or a substituted monocyclic carbocyclic aryloxy radical, e.g. phenyloxy, chloro-, methyl-, butyl-, octyl-, methoxy-, ethoxy-, phenoxy-, dimethylamino-, diethylamino-, or carbomethoxyphenoxy. If A is a bicyclic carbocyclic aryloxy radical it is preferably an unsubstituted naphthyloxy radical.

In the above formula, the $A-SO_2-$ radical can be in either ring of the naphthalene radical, e.g. in the 3-, 4-, 5-, 6-, 7- or 8-position of the naphthalene radical.

In the foregoing when the term "lower" is used, a total moiety is intended which contains 1 to 4 carbon atoms, e.g. in (lower)alkoxy(lower)alkyl, the total number of carbon atoms is 1 to 4.

Particularly valuable metal-free dyestuffs according to this invention correspond to the formula

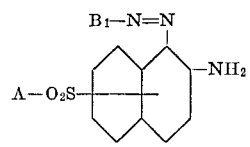

wherein $B_1$ is a radical of the benzene series which is preferably substituted by at least 1 chlorine or bromine atom or at least 1 nitro, cyano, methyl, methoxy, trifluoromethyl, carboethoxy or carbobutoxy group. Advantageously $B_1$ contains 2 or 3 of these substituents, of which one is nitro or cyano. A therein has the meaning given above.

In addition, dyestuffs in which $B_1$ in the above formula is the

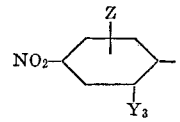

group wherein $Y_3$ is chlorine, bromine, cyano or nitro and Z is hydrogen, chlorine or bromine, and wherein the said $A$-$SO_2$ group is bound in the 5- or 6-position of the naphthalene nucleus, are particularly advantageous.

The dyestuffs according to the invention are suitable for the dyeing of hydrophobic synthetic textile fibers from aqueous dispersion, for example for the dyeing of cellulose di- to tri- acetate, particularly however, for the dyeing of high molecular esters of aromatic polycarboxylic acids and polyfunctional alcohols, e.g. of polyethylene glycol terephthalate such as "Terylene," "Tergal," or "Trevira." The dyestuffs can also be used, however, for the dyeing of synthetic polyamide fibers such as nylon 6 or nylon 66.

Light fast dyeings can also be obtained with the dyestuffs according to the invention on polyacrylonitrile fibers such as, e.g. "Orlon."

Polyester fibers are dyed with aqueous dispersions of dyestuffs according to the invention advantageously at temperatures of over 100° under pressure. Very good dyeings are also obtained if polyester fibers are impregnated with concentrated aqueous dispersions of dyestuffs according to the invention, the fabric is squeezed out, dried and then the dyeing is fixed at temperatures of 180–250°. The dyeing can also be performed at the boiling point of the water in the presence of color carriers such as, e.g. phenylphenol, polychlorobenzene compounds or similar auxiliaries.

In some cases the drawing power of the dyestuffs can be further improved by mixing two or more monoazo dyestuffs according to the invention together.

Depending on the composition and mixture of the dyestuffs, orange, red to violet dyeings are obtained on polyester fibers which have very good wet, sublimation and light fastness properties.

The dyestuffs according to the invention are also very well suited for dyeing of polyterephthalate ester fibers blended preferably with cotton, which blended fabrics are subsequently to be subjected to a treatment with hardenable dimethylol urea resins, and finally, after manufacture of apparel therefrom, to a hardening treatment at about 160–180° C., whereby the apparel is given so-called "wash-and-wear" properties (Koratron process).

The following non-limitative examples illustrate the invention. Where not otherwise expressly stated, parts are given therein as parts by weight. The temperatures are in degrees centigrade. The relationship of parts by weight to parts by volume is as that of grams to cubic centimeters.

EXAMPLE 1

18.3 parts of 1-amino-2,4-dinitrobenzenes are dissolved in 50 parts of concentrated sulphuric acid and diazotised at 15° with nitrosyl sulphuric acid for 10 hours (corresponding to 6.9 parts of sodium nitrite). The solution of diazonium compound is added dropwise at 5° to a suspension of 29.9 parts of 2-aminonaphthalene-5-sulphonic acid phenyl ester in 900 parts of water, 250 parts of 80% acetic acid and 5 parts of a synthetic dispersing agent. On completion of the coupling, the precipitate formed is filtered off, washed with water and dried at 60–70° in vacuo. The coupling product is a black-violet powder the composition of which corresponds to the formula.

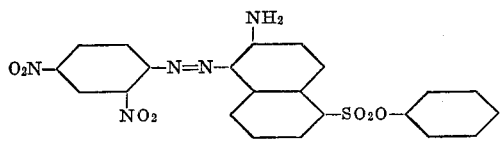

When milled with an anion active dispersing agent, the dyestuff so obtained dyes polyglycol terephthalate fibers such as "Dacron" from aqueous dispersion possibly in the presence of carriers, in bordeaux red shades. The bath is substantially exhausted. The dyeings are fast to washing, sublimation and light.

The 2-aminonaphthalene-5-sulphonic acid phenyl ester, M.P. 87–88°, used for the coupling is obtained, for example, by reaction of 2-carbobenzyloxyaminonaphthalene-5-sulphonic acid with phosphorus oxylchloride to form the corresponding sulphonic acid chloride, condensation thereof with phenol to form 2-carbobenzyloxyaminonaphthalene-5-sulphonic acid phenyl ester, M.P. 157–158°, and hydrogenolysis of the carbobenzyloxy group with hydrogen and palladium on charcoal as catalyst in dioxan.

EXAMPLE 2

A suspension of 17.3 parts of 1-amino-4-nitro-2-chlorobenzene in 300 parts of water and 30 parts of 36% hydrochloric acid is diazotised at 0–5° by the dropwise addition of 6.9 parts of sodium nitrite in 50 parts of water. The clear diazonium salt solution is added dropwise at 0–5° to a solution of 32.9 parts of 2-aminonaphthalene-6-sulphonic acid-(3'-methoxyphenyl)-ester in 1200 parts of water, 200 parts of 80% acetic acid and 2 parts of a non-ionogenic dispersing agent. After some hours, the reaction mixture is buffered to a pH of 4–4.5 by the addition of sodium acetate.

The dyestuff which precipitates, of the formula

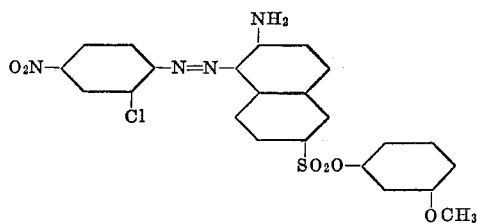

is filtered off, washed with water and dried in vacuo at 60–70°. The dyestuff is a brown-red powder. A composition produced by milling with a synthetic dispersing agent dyes polyglycol terephthalate fibers such as, e.g. "Terylene" or cellulose triacetate fibres, from an aqueous dispersion possibly in the presence of a carrier, in pure red shades. The dyeings are fast to rubbing, sublimation and light.

The coupling component used is obtained from 2-carbobenzyloxyaminonaphthalene-6-sulphonic acid and 3-methoxyphenol analogously to the method described in Example 1.

If in the above example, instead of the 17.3 parts of 1-amino-4-nitro-2-chlorobenzene, a corresponding amount of the diazo components given in column 2 of the following Tabe I are used and they are coupled under the conditions given in this example with one of the coupling components given in column 3, then dyestuffs are obtained which produce dyeings on polyester fibres having similarly good properties.

TABLE I

| No. | Diazo component | Coupling component | Shade on polyester fibres |
|---|---|---|---|
| 1 | 1-amino-2-nitrobenzene. | 2-aminonaphthalene-4-sulphonic acid phenyl ester. | Red. |
| 2 | do | 2-aminonaphthalene-5-sulphonic acid-(3'-ethoxyphenyl)-ester. | Reddish orange. |
| 3 | do | 2-aminonaphthalene-6-sulphonic acid-(4' tert. butylphenyl)-ester. | Do. |
| 4 | do | 2-aminonaphthalene-7-sulphonic acid phenyl-ester. | Do. |
| 5 | 1-amino-4-nitro-2-chlorobenzene. | 2-aminonaphthalene-3-sulphonic acid-(4'chlorophenyl)-ester. | Red. |
| 6 | do | 2-aminonaphthalene-5-sulphonic acid-(3'-methylphenyl)-ester. | Do. |
| 7 | do | 2-aminonaphthalene-5-sulphonic acid-(3'-dimethylaminophenyl)-ester. | Do. |
| 8 | do | 1-aminonaphthalene-3-sulphonic acid phenyl ester. | Do. |
| 9 | do | 1-aminonaphthalene-4-sulphonic acid-(2'-methylphenyl)-ester. | Red-violet. |
| 10 | 1-amino-2,4-dicyanobenzene. | 2-aminonaphthalene-5-sulphonic acid-(4'-carboxy ethoxyphenyl)-ester. | Red. |
| 11 | do | 2-aminonaphthalene-8-sulphonic acid-(4'-methoxyphenyl)-ester. | Do. |
| 12 | do | 2-methylaminonaphthalene-6-sulphonic acid-(3'-methylphenyl)-ester. | Red-violet. |
| 13 | 1-amino-4-nitro-2-cyanobenzene. | 2-aminonaphthalene-5-sulphonic acid-(4'-carboxyethoxyphenyl)-ester. | Blueish red. |
| 14 | do | 2-aminonaphthalene-5-sulphonic acid-(3'-methoxyphenyl)- | Do. |
| 15 | do | 1-aminonaphthalene-3-sulphonic acid-(4' phenoxyphenyl)-ester. | Red-violet. |
| 16 | do | 1-aminonaphthalene-4-sulphonic acid-(3'-chlorophenyl)-ester. | Do. |
| 17 | 1-amino-2,4-dinitrobenzene. | 2-aminonaphthalene-4-sulphonic acid phenyl ester. | Violet. |
| 18 | do | 2-methlyaminonaphthalene-5-sulphonic acid-(4'-carboxyethoxyphenyl)-ester. | Do. |
| 19 | do | 2-aminonaphthalene-5-sulphonic acid-(4'-octylphenyl)-ester. | Bordeaux red. |

TABLE I—Continued

| No. | Diazo component | Coupling component | Shade on polyester fibres |
|---|---|---|---|
| 20 | 1-amino-2,4-dinitrobenzene. | 2-aminonaphthalene-5-sulphonic acid-(4'-methoxyphenyl)-ester. | Bordeaux red. |
| 21 | do | 2-aminonaphthalene-8-sulphonic acid-(4'-methylphenyl)-ester. | Do. |
| 22 | 1-amino-4-nitro-3-carboxybutoxybenzene. | 2-aminonaphthalene-5-sulphonic acid-(4'-phenoxyphenyl)-ester. | Scarlet. |
| 23 | do | 2-aminonaphthalene-6-sulphonic acid-(4'-chlorophenyl)-ester. | Do. |
| 24 | 6-methoxy-2-aminobenzthiazole. | 2-aminonaphthalene-5-sulphonic acid-(3'-ethoxyphenyl)-ester. | Red. |
| 25 | do | 2-aminonaphthalene-7-sulphonic acid-(4'-methylphenyl)-ester. | Do. |
| 26 | 1-amino-2-bromo-4-nitrobenzene. | 2-methylaminonaphthalene-5-sulphonic acid-(2'-methylphenyl) ester. | Red-violet. |
| 27 | do | 2-ethylaminonaphthalene-6-sulphonic acid-(3'-methylphenyl)-ester. | Do. |

EXAMPLE 3

A fine suspension of 13.8 parts of 1-amino-2-nitro-benzene in 220 parts of water and 26 parts of 36% hydrochloric acid is diazotised in the usual way at 5–7° by the addition of 6.9 parts of sodium nitrite. The clear diazonium salt solution is poured at 0–5° into a dispersion of 23.6 parts of 2-aminonaphthalene-6-sulphonic acid methylamide in 1500 parts of water, 25 parts of 36% hydrochloric acid and 5 parts of an ethylene oxide-fatty alcohol condensation product. The reaction mixture is then buffered with sodium acetate to a pH of 4 to 4.5.

The dyestuff which precipitates, of the formula

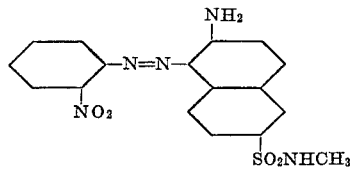

is filtered off, washed, dried in vacuo at 60° and milled with an alkyl-aryl benzene sulphonate. It is a red powder which dyes acetate silk or polyester fibres the latter possibly with the addition of carriers, in scarlet red shades from an aqueous dispersion. The dyeings have very good fastness to washing, sublimation and light.

If, in the above example, instead of the 13.8 parts of 1-amino-2-nitrobenzene, a corresponding amount of the diazo components given in column 2 of the following Table II is used and these are coupled under the same conditions with a coupling component given in column 3, then dyestuffs are obtained which produce dyeings on polyester fibres having the same good properties.

TABLE II

| No. | Diazo component | Coupling components or mixture of coupling components | Shade on polyester fibres |
|---|---|---|---|
| 1 | 1-amino-2-nitrobenzene. | 2-aminonaphthalene-6-sulphonic acid-N-methyl-N-(β-hydroxyethyl)-amide. | Scarlet. |
| 2 | do | 2-aminonaphthalene-6-sulphonic acid-N-phenyl-N-methylamide. | Do. |
| 3 | do | 2-aminonaphthalene-7-sulphonic acid diethylamide. | Do. |
| 4 | 1-amino-4-nitrobenzene. | 2-aminonaphthalene-6-sulphonic acid methoxyethylamide. | Do. |
| 5 | do | 2-aminonaphthalene-6-sulphonic acid dimethylamide. | Do. |

TABLE II—Continued

| No. | Diazo component | Coupling components or mixture of coupling components | Shade on polyester fibres |
|---|---|---|---|
| 6 | 1-amino-4-nitrobenzene | 2-aminonaphthalene-7-sulphonic acid cyclohexylamide. | Scarlet |
| 7 | do | 2-aminonaphthalene-6-sulphonic acid butylamide; 2-aminonaphthalene-7-sulphonic acid dimethylamide. | Do. |
| 8 | 1-amino-2-chloro-4-nitrobenzene. | 2-aminonaphthalene-6-sulphonic acid amide. | Red. |
| 9 | 1-amino-2-cyano-4-nitrobenzene. | 2-aminonaphthalene-6-sulphonic acid methylamide. | Red-violet. |
| 10 | do | 2-aminonaphthalene-7-sulphonic acid-N-methyl-N-(β-hydroxyethyl)-amide. | Do. |
| 11 | 1-amino-2-nitro-4-methylbenzene. | 2-aminonaphthalene-6-sulfonic acid ethylamide. | Scarlet. |
| 12 | do | 2-aminonaphthalene-6-sulfonic acid methoxypropylamide. | Do. |
| 13 | 1-amino-2,5-dichlorobenzene. | 2-aminonaphthalene-7-sulfonic acid dimethylamide. | Orange. |
| 14 | do | 2-aminonaphthalene-6-sulfonic acid benzylamide. | Do. |
| 15 | 1-amino-4-carboxyethoxybenzene. | 2-aminonaphthalene-6-sulfonic acid propylamide. | Do. |
| 16 | do | 2-aminonaphthalene-7-sulfonic acid cyclohexylamide. | Do. |
| 17 | 1-amino-2,5-dimethoxy-4-nitrobenzene. | 2-aminonaphthalene-6-sulfonic acid piperidide. | Red-violet. |
| 18 | 1-amino-2,6-dichloro-4-nitrobenzene. | 2-aminonaphthalene-6-sulfonic acid diethylamide. | Red. |
| 19 | 1-amino-2,4-dicyanobenzene. | 2-aminonaphthalene-6-sulfonic acid methylamide. | Do. |
| 20 | do | 2-aminonaphthalene-6-sulfonic acid cyclohexylamide. | Do. |
| 21 | 2-amino-5-sulfethylamidothiophene. | 2-aminonaphthalene-7-sulfonic acid butylamide. | Violet. |
| 22 | 2-aminothiadiazole. | 2-aminonaphthalene-6-sulfonic acid dimethylamide. | Orange. |
| 23 | 3-aminoindiazole. | 2-aminonaphthalene-6-sulfonic acid methylamide. | Do. |
| 24 | 1-aminonaphthalene. | 2-aminonaphthalene-6-sulfonic acid amide. | Scarlet. |
| 25 | 2-aminonaphthalene. | 2-aminonaphthalene-6-sulfonic acid methylamide. | Orange. |

EXAMPLE 4

A suspension of 17.3 parts of 1-amino-2-chloro-4-nitrobenzene in 300 parts of water and 30 parts of 36% hydrochloric acid is diazotized at 0–5° by the dropwise addition of a solution of 6.9 parts of sodium nitrite in 50 parts of water. The clear diazonium salt solution is added dropwise at 0–5° to a mixture of 11.1 parts of 2-aminonaphthalene-5-sulfonic acid amide and 11.8 parts of 2-aminonaphthalene-5-sulfonic acid methylamide in 1400 parts of water, 100 parts of alcohol and 40 parts of 36% hydrochloric acid. After one hour, the reaction mixture is buffered with sodium acetate to a pH of 4 to 4.5.

The red-violet coupling products of the composition

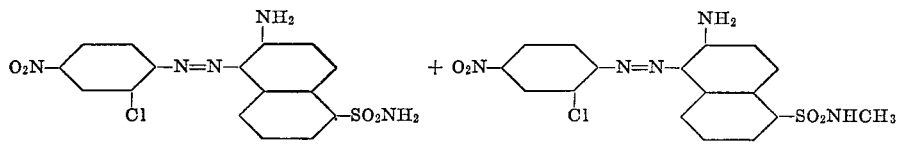

are filtered off, washed neutral with dilute sodium carbonate solution and then washed free of salt with water. The dyestuff mixture is dried at 60° under reduced pressure and then milled with a synthetic dispersing agent.

From aqueous dispersion, the mixture of the two dyestuffs dyes polyester fibres or triacetyl cellulose fibres, possibly with the addition of carriers, in blueish red shades. The dyeings possess a high degree of washing, perspiration, sublimation and light fastness properties.

Similar dyestuffs having the same good properties are obtained if equivalent amounts of the diazo components given in column 2 of the following Table III are coupled under the conditions described in the above example with corresponding amounts of the coupling components given in column 3.

TABLE III

| No. | Diazo component | Coupling components or mixtures of coupling components | Shade on polyester fibres |
|---|---|---|---|
| 1 | 1-amino-2-nitrobenzene | 2-aminonaphthalene-5-sulphonic acid amide | Scarlet. |
| 2 | 1-amino-4-nitrobenzene | 2-aminonaphthalene-5-sulphonic acid propylamide | Do. |
| 3 | 1-amino-2-chloro-4-nitrobenzene | 2-aminonaphthalene-5-sulphonic acid methoxyethylamide | Red. |
| 4 | do | 2-aminonaphthalene-5-sulphonic acid-N-methyl-N-($\beta$-hydroxyethyl)-amide | Do. |
| 5 | do | 2-aminonaphthalene-5-sulphonic acid-N-($\beta$-hydroxyethyl)-amide | Do. |
| 6 | 1-amino-2-cyano-4-nitrobenzene | 2-aminonaphthalene-5-sulphonic acid dibutylamide | Red-violet. |
| 7 | do | 2-aminonaphthalene-5-sulphonic acid piperidide | Do. |
| 8 | 1-amino-2-nitro-4-methylbenzene | 2-aminonaphthalene-5-sulphonic acid amide | Scarlet. |
| 9 | do | 2-aminonaphthalene-5-sulphonic acid methylamide; 2-aminonaphthalene-5-sulphonic acid dimethylamide. | Do. |
| 10 | 1-amino-2-nitro-4-trifluoromethyl-benzene. | 2-aminonaphthalene-5-sulphonic acid dimethylamide | Do. |
| 11 | 1-amino-2-nitro-4-methoxybenzene | 2-aminonaphthalene-5-sulphonic acid benzylamide | Do. |
| 12 | do | 2-aminonaphthalene-5-sulphonic acid morpholide | Do. |
| 13 | do | 2-aminonaphthalene-5-sulphonic acid methoxypropylamide | Do. |
| 14 | 1-amino-4-carboxyphenyloxy-benzene. | 2-aminonaphthalene-5-sulphonic acid benzylamide | Do. |
| 15 | do | 2-aminonaphthalene-5-sulphonic acid-N-phenyl-N-methylamide | Do. |
| 16 | 1-amino-2-6-dichloro-4-nitro-benzene. | 2-aminonaphthalene-5-sulphonic acid methylamide | Red. |
| 17 | do | 2-aminonaphthalene-5-sulphonic acid-N-($\beta$-hydroxyethyl)-amide | Do. |
| 18 | 2-aminothiadiazole | 2-aminonaphthalene-6-sulphonic acid cyclohexylamide | Orange. |
| 19 | do | 2-aminonaphthalene-5-sulphonic acid phenylamide | Do. |
| 20 | 1-aminonaphthalene | 2-aminonaphthalene-5-sulphonic acid butylamide | Scarlet. |
| 21 | 2-aminonaphthalene | 2-aminonaphthalene-5-sulphonic acid dimethylamide | Orange. |
| 22 | 1-amino-2-nitrobenzene | 2-aminonaphthalene-5-sulphonic acid benzylamide | Scarlet. |
| 23 | do | 2-aminonaphthalene-5-sulphonic acid-N-$\beta$-hydroxyethylamide | Do. |
| 24 | 1-amino-2-nitrobenzene | 2-aminonaphthalene-5-sulphonic acid-dibutylamine | Do. |
| 25 | 1-amino-4-nitrobenzene | 2-aminonaphthalene-5-sulphonic acid-butylamide | Do. |
| 26 | do | 2-aminonaphthalene-5-sulphonic acid-methylamide | Do. |
| 27 | 1-amino-2-chloro-4-nitrobenzene | 2-aminonaphthalene-5-sulphonic acid-ethylamide | Red. |
| 28 | do | 2-aminonaphthalene-5-sulphonic acid-N-$\beta\beta'$ di-(hydroxyethyl)-amide | Do. |
| 29 | do | 2-aminonaphthalene-5-sulphonic acid methylamide | Do. |
| 30 | do | 2-aminonaphthalene-5-sulphonic acid-N-phenyl-N-methylamide | Do. |
| 31 | do | 2-aminonaphthalene-5-sulphonic acid-amide; 2-aminonaphthalene-5-sulphonic acid-butylamide. | Do. |
| 32 | do | 2-aminonaphthalene-5-sulphonic acid-amide; 2-aminonaphthalene-5-sulphonic acid-$\lambda$-methoxypropylamide. | Do. |
| 33 | do | 2-aminonaphthalene-5-sulphonic acid-octylamide | Do. |
| 34 | 1-amino-2-bromo-4-nitrobenzene | 2-aminonaphthalene-5-sulphonic acid-ethylamide | Do. |
| 35 | 1-amino-2-bromo-4-nitrobenzene | 2-aminonaphthalene-5-sulphonic acid-amide; 2-aminonaphthalene-5-sulphonic acid-$\lambda$-methoxyproplyamide. | Do. |
| 36 | do | 2-aminonaphthalene-5-sulphonic acid-octylamide | Do. |
| 37 | 1-amino-2-bromo-4-nitrobenzene | 2-aminonaphthalene-5-N-$\beta$-hydroxy-ethylamide | Do. |
| 38 | 1-amino-2-cyano-4-nitrobenzene | 2-aminonaphthalene-5-sulphonic acid-$\gamma$-methoxyproplyamide | Ruby. |
| 39 | do | 2-aminonaphthalene-5-sulphonic acid-butylamide; 2-aminonaphthalene-5-sulphonic acid-amide. | Do. |
| 40 | do | 2-aminonaphthalene-5-sulphonic acid-amide; 2-aminonaphthalene-5-sulphonic acid-diethylamide. | Do. |
| 41 | do | 2-aminonaphthalene-5-sulphonic acid-methylamide; 2-aminonaphthalene-5-sulphonic acid-2'-methoxy-phenylamide. | Do. |
| 42 | do | 2-aminonaphthalene-5-sulphonic acid-2'-methoxy-phenylamide | Do. |
| 43 | 1-amino-2,4-dinitrobenzene | 2-aminonaphthalene-5-sulphonic acid-butylamide | Bordeaux. |
| 44 | do | 2-aminonaphthalene-5-sulphonic acid-N-$\beta$-hydroxyethylamide | Do. |
| 45 | do | 2-aminonaphthalene-5-sulphonic acid-$\gamma$-methypropylamide | Do. |
| 46 | do | 2-aminonaphthalene-5-sulphonic acid-2'-methoxyphenylamide | Do. |
| 47 | 1-amino-2,4-dinitro-6-chloro-benzene. | 2-aminonaphthalene-5-sulfonic acid-methylamide | Do. |
| 48 | do | 2-aminonaphthalene-5-sulfonic acid-ethylamide; 2-aminonaphthalene-5-sulfonic acid-N-$\beta$-hydroxethylamide. | Do. |
| 49 | 1-amino-2,5-dichloro-4-nitro-benzene. | 2-aminonaphthalene-5-sulfonic acid-methylamide | Red. |
| 50 | do | 2-aminonaphthalene-5-sulfonic acid-amide | Do. |
| 51 | 1-amino-2-chloro-4-nitrobenzene; 1-amino-2-bromo-4-nitrobenzene. | 2-aminonaphthalene-5-sulfonic acid-butylamide | Do. |
| 52 | 1-amino-2,4-dinitro-6-chloro-benzene. | 2-aminonaphthalene-8-sulfonic acid-$\gamma$-methoxypropylamide | Bordeaux. |
| 53 | do | 2-aminonaphthalene-5-sulfonic acid-4'-methylphenylamide | Do. |
| 54 | do | 2-aminonaphthalene-5-sulfonic acid-morpholide | Do. |

EXAMPLE 5

18.3 parts of 1-amino-2,4-dinitrobenzene are dissolved in 50 parts of concentrated sulphuric acid and the solution is diazotised for 10 hours at 15° with nitrosyl sulphuric acid, corresponding to 6.9 parts of sodium nitrite. The diazonium solution is added dropwise at 0–5° to a solution of 11.1 parts of 2-aminonaphthalene-5-sulphonic acid amide and 13.9 parts of 2-aminonaphthalene-5-sulphonic acid diethylamide in 50 parts of 30% hydrochloric acid, 40 parts of 80% acetic acid and 800 parts of water. On completion of the coupling, the precipitate formed is filtered off, washed with water and dried in vacuo at 60–70°.

The dyestuff mixture obtained of the formula

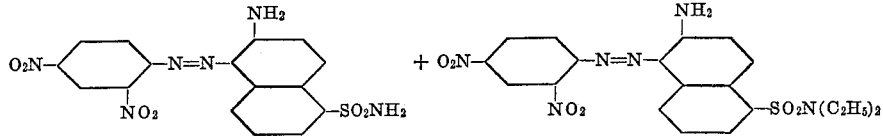

is a black-violet powder.

A preparation produced by milling with a synthetic dispersing agent dyes polyglycol terephthalate fibres, e.g. "Dacron" in Bordeaux red shades from an aqueous dispersion, possibly in the presence of a carrier. The dyeings are fast to washing, rubbing, light and sublimation.

EXAMPLE 6

16.3 parts of 1-amino-2-cyano-4-nitrobenzene are dissolved in 100 parts of concentrated sulphuric acid and the solution is diazotised in the usual way by the dropwise addition of nitrosyl-sulphuric acid, corresponding to 6.9 parts of sodium nitrite. The diazonium salt solution is poured into 400 parts of ice and 100 parts of water, clarified, and added dropwise at 0–5° to a solution of 31.2 parts of 2-aminonaphthalene-4-sulphonic acid phenylmethylamide in 100 parts of alcohol, 1400 parts of water and 30 parts of 36% hydrochloric acid. The dyestuff which precipitates of the formula

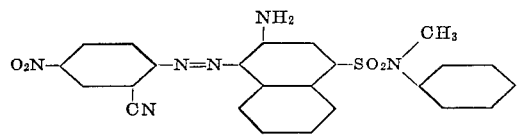

is filtered off on completion of the coupling, washed neutral and free of salt with water and dried in the usual way. It is a dark, red-brown powder. After milling with a dispersing agent, violet dyeings which are fast to light and sublimation are obtained from an aqueous dispersion thereof on polyester fibres such as "Tergal" of Rhodiaceta, Lyon.

Dyestuffs having similar properties are obtained if equivalent amounts of the diazo and coupling components given in the above Table IV are used under the conditions described in Example 6.

EXAMPLE 7

18.3 parts of 1-amino-2,4-di-nitro-benzene are diazotised at 15° for 10 hours in 40 parts of 80% sulphuric acid with nitrosyl sulphuric acid, corresponding to 6.9 parts of sodium nitrate.

The solution of the diazonium compound is then added dropwise at 0–5° while stirring to a dispersion of 29.2 parts of 2-methylaminonaphthalene-5-sulfonic acid diethylamide in 1400 parts of water, 25 parts of 36% hydrochloric acid and 5 parts of synthetic dispersing agent. The coupling is completed in the usual way and the product is worked up.

The dyestuff obtained of the constitution

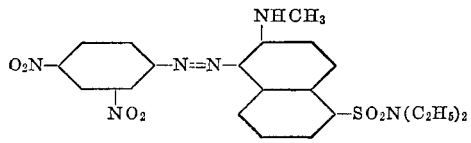

is a black-brown powder. Dispersed in water with an alkylbenzene sulfonate and with the addition of colour carriers such as o-phenylphenol, it dyes polyester fibers in violet shades. The dyeings have very good fastness to washing, and sublimation.

If, in the above example, instead of the 18.3 parts of 1-amino-2,4-dinitro-benzene, corresponding amounts of diazo components given in the following Table V are used and they are coupled under the conditions described in Example 7 with the coupling components given in column 3, then dyestuffs are obtained which produce dyeings having the same good properties on polyester fibers.

TABLE IV

| No. | Diazo component | Coupling components or mixtures of coupling components | Shade on polyester fibres |
|---|---|---|---|
| 1 | 1-amino-2-nitrobenzene | 2-aminonaphthalene-4-sulphonic acid methylamide | Red. |
| 2 | do | 2-aminonaphthalene-4-sulphonic acid-N-phenyl-N-methylamide | Do. |
| 3 | do | 2-aminonaphthalene-3-sulphonic acid dimethylamide | Scarlet. |
| 4 | 1-amino-4-nitrobenzene | 2-aminonaphthalene-4-sulphonic acid butylamide; 2-aminonaphthalene-4-sulphonic acid dibutylamide. | Red. |
| 5 | 1-amino-2-chloro-4-nitrobenzene | 2-aminonaphthalene-4-sulphonic acid amide | Red-violet. |
| 6 | do | 2-aminonaphthalene-4-sulphonic acid diethylamide | Do. |
| 7 | 1-amino-2-cyano-4-nitrobenzene | 2-aminonaphthalene-4-sulphonic acid methylamide | Do. |
| 8 | 1-amino-2-nitro-4-methylbenzene | 2-aminonaphthalene-4-sulphonic acid dimethylamide | Red. |
| 9 | 1-amino-4-carboxyethoxybenzene | 2-aminonaphthalene-4-sulphonic acid amide | Scarlet. |
| 10 | 2-amino-6-methoxybenzthiazole | 2-aminonaphthalene-4-sulphonic acid dimethylamide | Red-violet. |
| 11 | 2-amino-5-nitrothiazole | 2-aminonaphthalene-4-sulphonic acid amide | Violet. |
| 12 | 1-amino-2-nitro-4-methylbenzene | 2-aminonaphthalene-3-sulphonic acid-N-$\beta\beta'$-di-(hydroxyethyl)-amide | Scarlet. |
| 13 | do | 2-aminonaphthalene-4-sulphonic acid-N-methyl-N-$\beta$-hydroxyethylamide | Red. |
| 14 | do | 2-aminonaphthalene-4-sulphonic acid-dibutylamide | Do. |
| 15 | 1-amino-2-chloro-4-nitrobenzene | 2-aminonaphthalene-4-sulphonic acid methylamide; 2-aminonaphthalene-4-sulphonic butylamide. | Red-violet. |
| 16 | 1-amino-2-cyano-4-nitrobenzene | 2-aminonaphthalene-4-sulphonic acid-$\gamma$-methoxypropylamide | Do. |
| 17 | do | 2-aminonaphthalene-4-sulphonic acid amide; 2-aminonaphthalene-4-sulphonic acid-N-methyl-N-$\beta$-hydroxyethylamide. | Do. |
| 18 | 1-amino-2,4-dinitrobenzene | 2-aminonaphthalene-4-sulphonic acid propylamide | Bordeaux. |
| 19 | do | 2-aminonaphthalene-4-sulphonic acid ethylamide; 2-aminonaphthalene-4-sulphonic acid-N-phenyl-N-methylamide. | Do. |

TABLE V

| No. | Diazo component | Coupling components or mixture of coupling components | Shade on polyester fibres |
|---|---|---|---|
| 1 | 1-amino-2-nitrobenzene | 2-methylaminonaphthalene-5-sulphonic acid amide | Red. |
| 2 | do | 2-methylaminonaphthalene-6-sulphonic acid dimethylamide | Do. |
| 3 | do | 2-($\beta$-hydroxyethyl)-aminonaphthalene-5-sulphonic acid-N-phenyl-N-methylamide | Do. |
| 4 | do | 2-phenylaminonaphthalene-6-sulphonic acid methylamide | Do. |
| 5 | 1-amino-4-nitrobenzene | 2-butylaminonaphthalene-5-sulphonic acid dimethylamide | Do. |
| 6 | do | 2-butylaminonaphthalene-4-sulphonic acid methylamide | Do. |
| 7 | do | 2-methylaminonaphthalene-8-sulphonic acid methylamide | Do. |
| 8 | 1-amino-2-chloro-4-nitrobenzene | 2-methylaminonaphthalene-5-sulphonic acid amide; 2-methylaminonaphthalene-6-sulphonic acid diethylamide. | Ruby. |
| 9 | 1-amino-2-nitro 4-methylbenzene | 2-(o-tolyl)-aminonaphthalene-5-sulphonic acid cyclohexylamide | Red. |
| 10 | do | 2-methylaminonaphthalene-6-sulphonic acid-N-phenyl-N-methylamide | Do. |
| 11 | do | 2-methylaminonaphthalene-5-sulfonic acid dimethylamide | Reddish violet. |
| 12 | 1-amino-2,5-dichlorobenzene | 2-methylaminonaphthalene-5-sulfonic acid diethylamide | Red. |
| 13 | do | 2-methylaminonaphthalene-5-sulfonic acid amide | Do. |
| 14 | 2-amino-6-methylsulfonyl-benzthiazole. | 2-methylaminonaphthalene-5-sulfonic acid amide | Violet |

EXAMPLE 8

18 parts of 2-amino-6-methoxy-benzthiazole in 100 parts of concentrated sulphuric acid are diazotised for 3 hours at 0–5° with nitrosyl sulphuric acid, corresponding to 6.9 parts of sodium nitrite.

The diazonium salt solution is poured while cooling well into a dispersion of 26.6 parts of 1-aminonaphthlene-4-sulfonic acid-N-($\beta$-hydroxyethyl)-amide in 1500 parts of water, 30 parts of 36% hydrochloric acid and 5 parts of a synthetic dispersion agent.

The mineral acid is buffered by the addition of sodium acetate. The coupling is completed by stirring for 14 hours at 0–5.° The black-violet reaction product which precipitates is filtered off, washed with a great deal of water and dried in vacuo at 60°.

After milling with a synthetic dispersing agent, the dyestuff of the formula

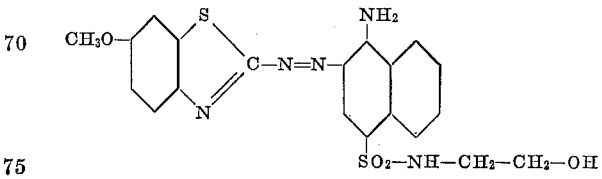

dyes polyester fibres such as "Trevira" of Farbwerke Hoechst Frankfurt am Main in pure violet shades. The dyeings have excellent water and washing fastness properties.

Similar dyestuffs with the same good properties are obtained if equivalent amounts of the diazo components given in column 2 of the following Table VI are coupled under the conditions described in the above example with the corresponding amounts of the coupling components given in column 3.

composition of the compound corresponds to the formula

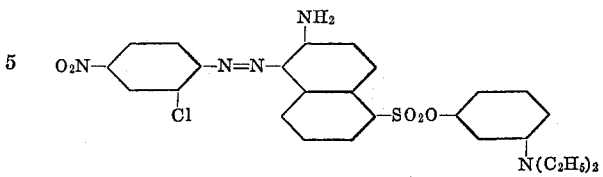

TABLE VI

| No. | Diazo component | Coupling components | Shade on polyester fibres |
| --- | --- | --- | --- |
| 1 | 1-amino-2-nitrobenzene | 1-aminonaphthalene-4-sulphonic acid dimethylamide | Scarlet. |
| 2 | do | 1-aminonaphthalene-3-sulphonic acid diethylamide | Do. |
| 3 | do enzene | 1-methylaminonaphthalene-4-sulphonic acid amide | Red. |
| 4 | 1-amino-2-chloro-4-nitrobenzene | 1-aminonaphthalene-4-sulphonic acid methylamide | Do |
| 5 | 1-amino-2-cyano-4-nitrobenzene | 1-aminonaphthalene-4-sulphonic acid dimethylamide | Bordeaux. |
| 6 | 1-amino-4-carboxyethoxybenzene | 1-aminonaphthalene-3-sulphonic acid cyclohexylamide | Orange. |
| 7 | 1-amino-2,5-dichlorobenzene | 1-aminonaphthalene-4-sulphonic acid amide | Do. |
| 8 | 2-amino-5-nitro-thiazole | 1-aminonaphthalene-4-sulphonic acid dimethylamide | Violet. |

EXAMPLE 9

A fine suspension of 17.3 parts of 1-amino-2-chloro-4-nitrobenzene in 220 parts of water and 26 parts of 36% hydrochloric acid is diazotised in the usual way at 5–7° with 6.9 parts of sodium nitrite.

The clear solution of the diazonium salt is added dropwise at 0–5° while stirring to a suspension of 35.8 parts of 2-aminonaphthalene - 5 - diethylamidosulphonyl-1-sulphonic acid in 1500 parts of water, 30 parts of 36% hydrochloric acid and 5 parts of an ethylene oxide-fatty alcohol condensation product. The whole is stirred for several hours at 0–5°, sodium acetate is added to buffer the hydrochloric acid and stirring is continued to complete the coupling. The violet-red dyestuff which precipitates of the formula

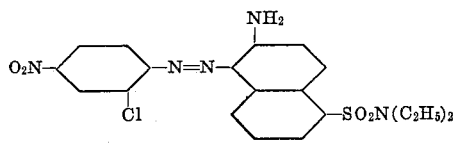

is filtered off under suction, washed with a great deal of water and dried in vacuo at 60°.

Milled with a synthetic dispersing agent, it dyes terephthalic acid polyester fibres from an aqueous dispersion, possibly with the addition of carriers, in blueish red shades.

The dyeings have very good fastness to washing, sublimation and light. The coupling component is obtained, for example by reacting sulphuric acid monohydrate with 2-aminonaphthalene-5-sulphonic acid diethylamide in the cold.

If, in the above example, the 35.8 parts of 2-aminonaphthalene-5-diethylamidosulphonyl - 1 - sulphonic acid are replaced by 31.6 parts of 2 - aminonaphthalene-5-methylamidosulphonyl-1-sulphonic acid or by 33.0 parts of 2-aminonaphthalene - 6 - dimethylamidosulphonyl-1-sulphonic acid and the coupling is performed under the conditions described in the above example, then dyestuffs are obtained which produce red dyeings on polyester fibres which have the same good properties.

EXAMPLE 10

12 parts of 1 - (2'-chloro-4'-nitrophenylazo)-2-aminonaphthalene-5-sulphonic acid chloride and 8 parts of the sodium salt of 3-diethylaminophenol in 100 parts of toluene are heated for 4 hours at 80–90°. After cooling the reaction mixture, the precipitated dyestuff is filtered off, washed with water and dried in vacuo at 60–70°. The It is a brown red powder. After milling with a condensation product of naphthalene sulphonic acids with formaldehyde, the dyestuff so obtained dyes polyglycol terephthalate fibres such as "Dacron" in pure red shades from an aqueous dispersion, possibly in the presence of carriers. The dyeings are fast to rubbing, light and sublimation.

The 1-(2'-chloro-4' - nitrophenylazo)-2-naphthalene-5-sulphonic acid chloride used as starting material is obtained by coupling diazotised 1-amino-2-chloro-4-nitrobenzene with 2-aminonaphthalene-5-sulphonic acid and reacting the dyestuff sulphonic acid with phosphorus oxychloride in chlorobenzene, in the presence of a tertiary nitrogen base.

EXAMPLE 11

15 parts of 1 - (2'-cyano-4'-nitrophenylazo)-2-aminonaphthalene-5-sulphonic acid chloride and 8 parts of 3-methoxyphenol and 8 parts of sodium carbonate in 75 parts of acetone and 100 parts of water are heated for 3 hours at 65–70°. After cooling, 300 parts of water are added to the reaction mixture. The dark precipitate formed is filtered off under suction, washed with water and dried in vacuo at 60–70°. The dyestuff is a black-brown powder. Its composition corresponds to the formula

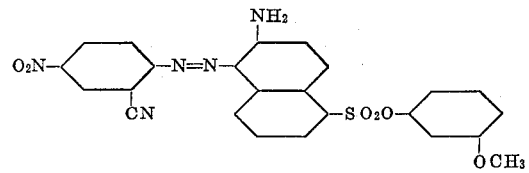

The compound is identical with the dyestuff obtained according to Example 2, Table 1, No. 14. A dye preparation milled with a synthetic dispersing agent which contains the dyestuff in finely dispersed form dyes polyglycol terephthalate fibres, e.g. "Terylene" from aqueous dispersion, possibly in the presence of carriers, in pure blueish red shades. The dyeings are fast to washing, rubbing, sublimation and light.

The 1-(2'-cyano-4'-nitrophenylazo)-2-aminonapthalene-5-sulphonic acid chloride used as starting material is obtained by coupling diazotised 1 - amino-4-nitro-2-cyanobenzene with 2-aminonaphthalene-5-sulphonic acid and reacting the dyestuff sulphonic acid with phosphorus oxychloride in chlorobenzene, in the presence of a tertiary nitrogen base.

If in the above example, instead of the 15 parts of 1-(2'-cyano-4'-nitrophenylazo) - 2 - aminonaphthalene-5-sulphonic acid chloride, corresponding amounts of the sulphonic acid chlorides given in the following Table VII are used and they are condensed under the conditions described in the example with one of the hydroxyaryl compounds given in column 3, then dyestuffs are obtained which produce dyeings having similarly good properties on polyester fibres.

TABLE VII

| No. | Sulphonic acid chloride | Hydroxyaryl compound | Shade on polyester fibre |
|---|---|---|---|
| 1 | 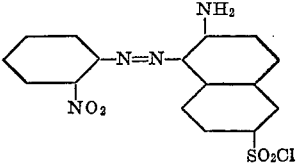 | 4-methyl-1-hydroxybenzene | Red-orange. |
| 2 | Same as above | 4-hydroxydiphenyl ether | Do. |
| 3 | 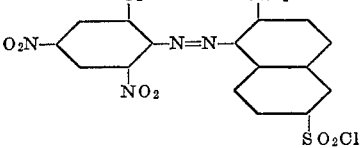 | 4-chloro-1-hydroxybenzene | Bordeaux. |
| 4 | 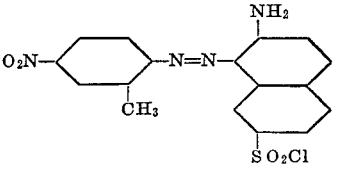 | 3-methoxy-1-hydroxy benzene | Scarlet. |
| 5 | 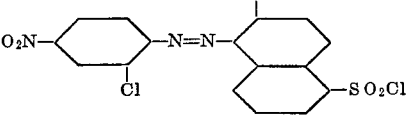 | Mixture of 2-methyl-1-hydroxybenzene and 4-methyl-1-hydroxybenzene. | Red. |
| 6 | Same as above | 3-methoxy-1-hydroxybenzene | Do. |
| 7 | 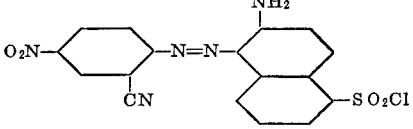 | 4-tert. butyl-1-hydroxybenzene | Blueish red |
| 8 | 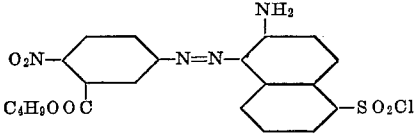 | 4-dimethylamino-1-hydroxybenzene | Scarlet. |
| 9 | 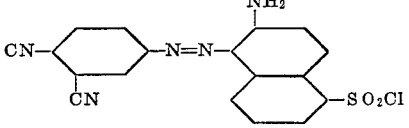 | 3-methyl-1-hydroxybenzene | Do. |
| 10 | 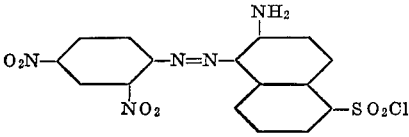 | 3-methoxy-1-hydroxybenzene | Bordeaux. |
| 11 | 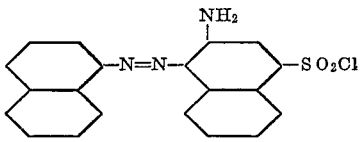 | 2-methoxy-1-hydroxybenzene | Red. |
| 12 | 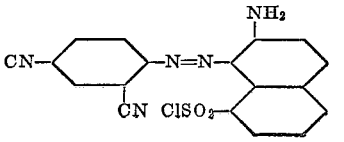 | 4-tert. butyl-1-hydroxybenzene | Do. |

TABLE VII—Continued

| No. | Sulphonic acid chloride | Hydroxyaryl compound | Shade on polyester fibre |
|---|---|---|---|
| 13 | O₂N–⟨Cl⟩–N=N–⟨H₂H, SO₂Cl, NO₂⟩ | 4-hydroxydiphenyl ether | Bordeaux. |
| 14 | O₂N–⟨CH₃⟩–N=N–⟨NHCH₃, SO₂Cl⟩ | 4-methyl-1-hydroxybenzene | Red. |
| 15 | O₂N–⟨Cl⟩–N=N–⟨NH₂, SO₂Cl⟩ | 4-dimethylamino-1-hydroxybenzene | Do. |
| 16 | CH₃O–⟨S,N⟩C–N=N–⟨NH₂, SO₂Cl⟩ | 4-methyl-1-hydroxybenzene | Do. |
| 17 | O₂N–⟨NO₂⟩–N=N–⟨NH₂, SO₂Cl⟩ | Hydroxybenzene | Bordeaux. |
| 18 | ⟨NO₂⟩–N=N–⟨NH₂, SO₂Cl⟩ | 3-methozy-1-hydroxybenzene | Red-orange. |
| 19 | O₂N–⟨Cl⟩–N=N–⟨NH₂, SO₂Cl⟩ | mixture of α- and β-naphthol | Red. |
| 20 | O₂N–⟨CN⟩–N=N–⟨NH₂, SO₂Cl⟩ | 2-chloro-1-hydroxybenzene | Red-violet. |
| 21 | O₂N–⟨Cl⟩–N=N–⟨NH₂, SO₂Cl⟩ | mixture of 2-methyl-1-hydoxy benzene and hydroxybenezne | Do. |
| 22 | O₂N–⟨Cl⟩–N=N–⟨NH₂, SO₂Cl⟩ | 2-hydrozymethyl-1-hydroxybenzene | Red. |
| 23 | Same as above | 3-acetylamino-1-hydroxybenzene | Do. |
| 24 | do | 3-dimethylamino-1-hydroxybenzene | Do. |
| 25 | O₂N–⟨NO₂⟩–N=N–⟨NH₂, SO₂Cl⟩ | 2-ethoxycarbonyl-1-hydroxybenzene | Bordeaux. |
| 26 | Same as above | 1-hydroxy-2-(N-methylcarbamyl)-benzene | Do. |

TABLE VII—Continued

| No. | Sulphonic acid chloride | Hydroxyaryl compound | Shade on polyester fibre |
|---|---|---|---|
| 27 | 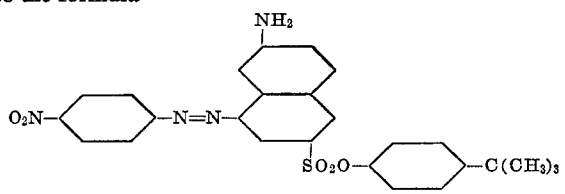 | 2-hydroxymethyl-1-hydroxybenzene | Do. |

EXAMPLE 12

12 parts of 1-(2',4'-dinitrophenylazo)-2-aminonaphthalene-6-sulphonic acid chloride, 8 parts of p-tert. butylphenol and 8 parts of sodium carbonate in 50 parts of ethylene glycol monoethyl ether and 75 parts of water are heated for 2 hours at 75–85°. After cooling, 400 parts of water are added to the reaction mixture. The dyestuff which precipitates, the composition of which corresponds to the formula

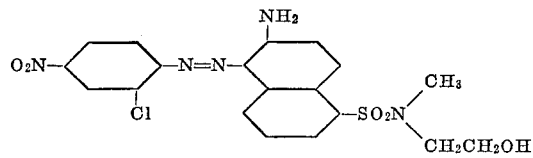

is filtered off and washed and dried in the usual way. It is a blue-black powder. After milling with a synthetic dispersing agent, light-fast bordeaux red dyeings can be attained with this dyestuff on polyamide fibres such as "Nylon."

The 1 - (2',4' - dinitrophenylazo)-2-aminonaphthalene-6-sulphonic acid chloride used as starting material is obtained by coupling diazotised 1-amino-2,4-dinitrobenzene with 2-aminonaphthalene-6-sulphonic acid and reacting the dyestuff sulphonic acid with phosphorus oxychlorobenzene, in the presence of a tertiary nitrogen base.

EXAMPLE 13

10 parts of 1-(2'-chloro-4'-nitrophenylazo)-2-aminophthalene-5-sulphonic acid chloride and 5 parts of N-methyl-N-(β-hydroxyethyl)-amine in 40 parts of water are heated for 2 hours at 70–80°. After cooling, the reaction mixture is diluted with 200 parts of water. The dyestuff of the formula

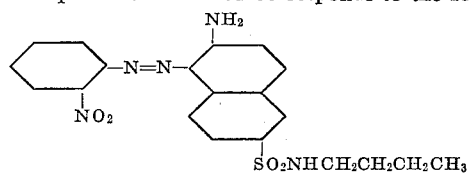

which can easily be filtered is filtered off, washed with water and dried in vacuo at 60–70°. The compound obtained is identical with the coupling product given in Example 4, Table III No. 4. The dyestuff is a dark red powder. A preparation produced by milling the dyestuff with a synthetic dispersing agent dyes polyglycol terephthalate fibres such as "Terylene" in pure red shades from aqueous dispersion, possibly with the addition of a carrier. The dyeings are fast to washing, rubbing, light and sublimation.

The 1 - (2' - chloro - 4' - nitrophenylazo)-2-aminonaphthalene-5-sulphonic acid chloride used as starting material is obtained by coupling diazotised 1-amino-2-chloro-4-nitrobenzene with 2-aminonaphthalene-5-sulphonic acid and reacting the dyestuff sulphonic acid with phosphorus oxychloride in chlorobenzene, in the presence of a tertiary nitrogen base.

EXAMPLE 14

12 parts of 1-(2'-nitrophenylazo)-2-aminonaphthalene-6-sulphonic acid chloride and 8 parts of butylamine are heated for 4 hours at 60–65° in 75 parts of acetone and 50 parts of water. After cooling, 250 parts of water are added to the reaction mixture. The dyestuff which precipitates is filtered off, washed with water and dried in the usual way. It is a yellow-brown powder. The composition of the compound so obtained corresponds to the formula $$\underset{NO_2}{\underset{|}{\bigcirc}}-N=N-\underset{SO_2NHCH_2CH_2CH_2CH_3}{\bigcirc}$$

The dyestuff milled with an alkylbenzene sulphonate dyes polyglycol terephthalate or cellulose triacetate fibres from aqueous dispersion in scarlet red shades which are fast to light and sublimation.

The 1 - (2' - nitrophenylazo) - 2-aminonaphthalene-6-sulphonic acid chloride used as starting material is obtained by coupling diazotised 1-amino-2-nitrobenzene with 2-aminonaphthalene-6-sulphonic acid and reacting the dyestuff sulphonic acid with phosphorous oxychloride in chlorobenzene, in the presence of a tertiary nirtogen base.

Dyestuffs having similar properties are obtained if equivalent amounts of the sulphonic acid chlorides given in column 2 of the following Table VIII are condensed under the conditions described in the above example with corresponding amounts of the amines given in column 3.

TABLE VIII

| No. | Sulphonic acid chloride | Amine | Shade on polyester fibres |
|---|---|---|---|
| 1 | CH₃—⟨ ⟩—N=N—⟨ ⟩—SO₂Cl (with NO₂) | ⟨ ⟩—NHCH₃ | Scarlet. |
| 2 | O₂N—⟨ ⟩—N=N—⟨ ⟩—SO₂Cl (with NO₂, NH₂) | H₂N—CH₂CH₂CH₂OCH₃ | Bordeaux. |
| 3 | Same as above | H₂N-octyl | Do. |

TABLE VIII—Continued

| No. | Sulphonic acid chloride | Amine | Shade on polyester fibres |
|---|---|---|---|
| 4 | O$_2$N—⬡(CN)—N=N—⬡⬡(NH$_2$)(SO$_2$Cl) | NH(CH$_2$CH$_2$CH$_2$CH$_3$)$_2$ | Bluish red. |
| 5 | ⬡(NO$_2$)—N=N—⬡⬡(NH$_2$)(SO$_2$Cl) | H$_2$N—CH$_2$CH$_3$ | Scarlet. |
| 6 | ⬡(NO$_2$)—N=N—⬡⬡(NH$_2$)(SO$_2$Cl) | NH(CH$_2$CH$_2$OH)$_2$ | Do. |
| 7 | O$_2$N—⬡(Cl)—N=N—(ClSO$_2$)⬡⬡(NH$_2$) | HN(CH$_3$)$_2$ | Red. |
| 8 | O$_2$N—⬡(Cl)(Cl)—N=N—⬡⬡(NH$_2$)(SO$_2$Cl) | HN(CH$_2$CH$_3$)$_2$ | Do. |
| 9 | O$_2$N—⬡(CH$_3$)—N=N—⬡⬡(NH$_2$)—SO$_2$Cl | H$_2$N—⬡ | Do. |
| 10 | CH$_3$O—⬡(S,N)C—N=N—⬡⬡(NH$_2$)—SO$_2$Cl | H$_2$N—CH$_2$CH$_2$CH$_2$OCH$_3$ | Red-violet. |
| 11 | O$_2$N—⬡(C$_2$H$_5$OOC)—N=N—⬡⬡(NHCH$_3$)—SO$_2$Cl | H$_2$N—⬡(OCH$_3$) | Red. |
| 12 | O$_2$N—⬡(Cl)—N=N—⬡⬡(NHC$_2$H$_5$)(SO$_2$Cl) | H$_2$N—CH$_2$CH$_2$CH$_2$—CH$_3$ | Red-violet. |
| 13 | O$_2$N—⬡(CN)—N=N—⬡⬡(NH$_2$)(SO$_2$Cl—) | NH(CH$_3$)(CH$_2$CH$_2$OH) | Violet-red. |

TABLE VIII—Continued

| No. | Sulphonic acid chloride | Amine | Shade on polyester fibres |
|---|---|---|---|
| 14 | $O_2N-\langle\rangle-N=N-$ (with Br) naphthalene with $NH_2$ and $SO_2Cl$ | $H_2N-CH_2CH_2OH$ | Red. |
| 15 | $O_2N-\langle\rangle-N=N-$ (with $NO_2$) naphthalene with $NH_2$ and $SO_2Cl$ | $NH(CH_2CH_2OH)(C_6H_5)$ | Bordeaux red. |
| 16 | $O_2N-\langle\rangle-N=N-$ (with Cl) naphthalene with $NH_2$ and $-SO_2Cl$ | $H_2N-\langle\rangle-CH_3$ | Red. |
| 17 | Same as above | $NH\begin{pmatrix}CH_2-CH_2\\CH_2-CH_2\end{pmatrix}N-CH_2CH_2OH$ | Do. |

EXAMPLE 15

2 parts of the dyestuff mixture obtained according to Example 5 are dispersed in 4000 parts of water. 12 parts of the sodium salt of o-phenylphenol and 12 parts of diammonium phosphate are added to this dispersion and 100 parts of a polyester fabric are dyed for 1½ hours at 95–98°. The dyeing is rinsed and after-treated with dilute caustic soda lye and a dispersing agent.

A bordeaux dyeing is obtained which is fast to washing, rubbing, light and sublimation.

If in this example, the 100 parts of terephthalic acid polyglycol ester fabric are replaced by 100 parts of cellulose triacetate fabric, dyeing is performed under the conditions given and the dyeing is then rinsed with water, then a pure bordeaux dyeing is produced which has very good fastness to perspiration, and sublimation.

EXAMPLE 16

2 parts of the dyestuff mixture obtained according to Example 4 in 2000 parts of water which contains 4 parts of a synthetic dispersing agent are finely suspended in a pressure dyeing apparatus. The pH of the dyebath is adjusted to 6 to 6.5 with acetic acid.

100 parts of terephthalic acid polyester fabric are introduced at 50°, the temperature is raised within 30 minutes to 140° and dyeing is performed for 50 minutes at this temperature. The dyeing is then rinsed with water, soaped and dried. When these conditions are kept, a blueish red dyeing is obtained which is fast to washing, perspiration, light and sublimation.

The dyestuffs described in the other examples produce dyeings of equal quality when used according to this process.

EXAMPLE 17

3 parts of the dyestuff obtained according to Example 11 are dispersed in 4000 parts of water. 25 parts of the sodium salt of o-phenylphenol and 25 parts of diammonium phosphate are added to this dispersion and 100 parts of polyglycol terephthalate yarn are dyed for 1½ hours at 95–98°. The dyeing is rinsed and after-treated with caustic soda lye and a dispersing agent. Under these conditions a pure blueish red dyeing is obtained which has very good fastness to sublimation and light.

EXAMPLE 18

Polyglycol terephalate fabric such as "Dacron" of E.I. du Pont de Nemours is impregnated in a padding mangle at 40° with an aqueous dispersion composed as follows:

20 parts of the dyestuff mixture obtained according to Example 4, finely dispersed in
7.5 parts of sodium alginate,
20 parts of triethanolamine,
20 parts of a non-inorganic wetting agent and
900 parts of water.

The fabric is squeezed out to 100% increase of its original weight, dried at 100° and the dye is fixed for 30 seconds at a temperature of 210°. The dyed fabric is rinsed with water, soaped and dried. Under these conditions, a blueish red dyeing is obtained which is fast to washing, rubbing, light and sublimation.

The dyestuffs described in the other examples also produce dyeings of equal quality by this process.

EXAMPLE 19

43.5 parts of 1-(2′,4′-dinitro-phenylazo)-2-amino-naphthalene-5-sulfonic acid chloride, 15 parts of 3-hydroxypyridine and 15 parts of sodium carbonate in 300 parts of ethyl alcohol and 250 parts of water are heated for 4 hours at 70–75°. After cooling, 600 parts of water are added to the reaction mixture. The dark precipitate formed is filtered off, washed with water and then dried in vacuo at 70–80°. The dyestuff so obtained is a black-brown powder. Its composition corresponds to the formula

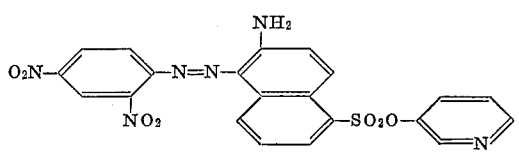

A preparation produced by milling this dyestuff with an alkali-lignin sulfonate, dyes polyglycol terephthalate fibers in reddish violet shades from an aqueous dispersion, sometimes in the presence of a carrier such as o-phenylphenol. The dyeings have very good fastness to washing, rubbing, light and sublimation.

The 1-(2',4'-dinitro-phenylazo)-2-aminonaphthalene-5-sulfonic acid chloride used as starting material in the above example is obtained by coupling diazotised 1-amino-2,4-dinitrobenzene with 2-aminonaphthalene-5-sulfonic acid and reacting the dyestuff sulfonic acid obtained with phosphorus oxychloride in chlorobenzene, in the presence of a catalytic amount of pyridine.

In the description of a second aspect of the invention given below, where reference is made to preceding numbers of formulas or examples or symbols used in such formulas, it is to the identified formula, example or symbol in connection with this second aspect of the invention.

According to this second aspect of the invention, it has now been found that new, valuable, metal-free monoazo dyestuffs which are difficulty soluble in water are obtained if a diazonium compound of the benzene series is coupled with a compound of the Formula I

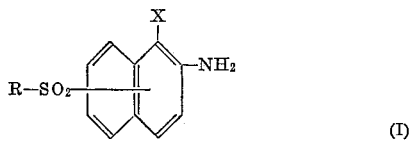

wherein X represents hydrogen or a substituent which can be replaced by the diazo group, and R represents an unsubstituted lower alkyl or a monocyclic aryl group, and the components are so chosen that the dyestuffs do not contain any water solubilizing groups which dissociate acid in water, and are free from metallizable substituent groupings in their molecules.

In 2-aminonaphthalene sulfones of Formula I, a 1-sulfonic acid group is employed as substituent X which can be replaced by the diazo group.

As defined, diazonium compounds of the benzene series usable according to the invention should not contain any substituents which dissociate acid in water such as sulfonic acid or carboxylic acid groups. The benzene radicals can otherwise be mono- or poly- substituted as desired, for example by hydrocarbon groups such as methyl, ethyl, isopropyl, tert. amyl, cyclohexyl, isooctyl, phenyl, benzyl groups, by ether groups such as methoxy, ethoxy, 2-hydroxy-ethoxy, phenoxy, cresoxy, chlorophenoxy, phenylthio groups; by acylamino groups such as acetylamino, chloroacetylamino, β-chloropropionylamino, methylsulphonylamino, chloromethylsulphonylamino, benzoylamino, chlorobenzoylamino groups; by chlorotriazinylamino, chloropyrimidylamino groups; in particular, however, by electrophilic substituents such as the nitro group, the trifluoromethyl group, the cyano group, the halogens fluorine, chlorine and bromine, keto groups, ester groups such as the carbomethoxy, carboethoxy, carboisopropyloxy, carbobutyloxy, carbocyclohexyloxy, carbophenyloxy, carbobenzyloxy group; by sulphonic acid amide groups such as the sulphonic acid dimethylamide, diethylamide, dibutylamide, cyclohexylamide, phenylethylamide, piperidide, and morpholide group.

Those diazonium compounds are preferred, which contain at least one electrophilic substituent in the o- or the p-position to the diazonium group. Dyestuffs which are specially fast to light are obtained from diazonium compounds containing electrophilic substituents in the o- and p-positions to the diazonium group.

Coupling components usable according to the invention contain the sulphonyl group —$SO_2R$ in the 3-, 4-, 5-, 6-, 7- or 8-position. When R represents an unsubstituted lower alkyl group, it is e.g. the methyl, ethyl, propyl, iso-propyl, butyl or iso-butyl group; when R represents a monocyclic aryl group it is preferably the phenyl, methylphenyl or chlorophenyl group.

Dyestuffs which are produced by coupling diazonium compounds usable according to the invention with 2-aminonaphthalene-3-sulphones, 2 - aminonaphthalene - 4-sulphones, 2-aminonaphthalene-5-sulphones and 2-aminonaphthalene-6-sulphones have surprisingly good affinity to hydrophobic polyester fibers.

The same dyestuffs are obtained by coupling diazonium compounds usable according to the invention with the corresponding 2-aminonaphthalene alkylsulphonyl- and arylsulphonyl-1-sulphonic acids.

Good dispersibility of dyestuffs according to the invention is attained on the one hand by suitable choice of the diazonium compound and on the other by suitable substitution of the coupling component. Suitable substituents of coupling components according to the invention are, for example, the methylsulphonyl, ethylsulphonyl, propylsulphonyl, ispropylsulphonyl, butylsulphonyl, phenylsulphonyl, and the tolylsulphonyl group.

Aminonaphthalene methylsulphones usable according to the invention are obtained, for example, by reduction of suitable acylaminonaphthalene sulphonic acid chlorides with sodium sulphite to form the corresponding sulphinic acids, condensation of these with chloroacetic acid followed by decarboxylation of the carboxymethylsulphonyl group and simultaneous saponification of the acylamino group. For example, starting from 2-acetyl-aminonaphthalene-5-sulphonic acid chloride the corresponding 2-aminonaphthalene-5-methyl-sulphone is obtained by this process. It is obtained in good yield and melts at 137–138°.

Aminonaphthalene arylsulphones usable according to the invention are obtained, e.g. by careful reaction of corresponding acylaminonaphthalene sulphonic acid chlorides with benzene hydrocarbons in the presence of suitable Lewis acids and subsequent saponification of the acylamino groups.

Thus, for example, 2-aminonaphthalene-5-p-tolylsulphone, M.P. 196–197°, is obtained by reaction of 2-acetyl-aminonaphthalene-5-sulphonic acid chloride with toluene in the presence of aluminium chloride and subsequent saponification of the acetylamino group.

The coupling is performed preferably in mineral acid to weakly acid aqueous solution, advantageously while gradually buffering the mineral acid, e.g. with alkali metal salts of low fatty acids. It is also possible to couple a suitable diazonium compound with a mixture of two or more coupling components usable according to the invention, the coupling being performed simultaneously.

The dyestuffs according to the invention are suitable for the dyeing of hydrophobic synthetic textile fibres from aqueous dispersion, e.g. for the dyeing of cellulose triacetate. They are particularly suitable, however, for the dyeing of high molecular esters of aromatic polycarboxylic acids with polyfunctional alcohols, e.g. glycol terephthalates such as "Terylene" or "Dacron" "Tergal" or "Trevira." The dyestuffs can also be used for the dyeing of synthetic polyamide such as "nylon" or of "Perlon."

Polyester fibres are dyed with aqueous dispersions of dyestuffs according to the invention, advantageously at temperatures of over 100° under pressure. Dyeing can also be performed, however, at the boiling point of the water in the presence of colour carriers such as, e.g. phenylphenol, polychlorobenzene compounds or similar auxiliaries.

In some cases, the drawing power of the dyestuffs can be further improved by mixing two or more of the monoazo dyestuffs according to the invention.

Depending on their composition and the mixture of the dyestuffs, orange, red to violet dyeings can be attained on polyester fibers which have very good wet fastness as well as very good fastness to sublimation and light.

In the broadest aspect of the invention it concerns monoazodyestuffs of the formulae V, VI, VII and VIII

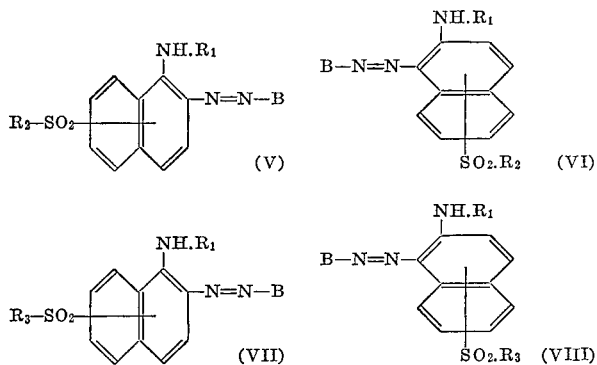

wherein B is aryl consisting of from one to two six-membered rings, with maximally 10 ring carbon atoms, and of, as the exclusive substituents, from 0 to 2 of the dispersibility-steering substituents defined below and from 0 to 3 of the shade-influencing substituents defined below; preferably, B is aryl with six ring carbon atoms, and with from 1 to 3 shade-influencing substituents as the exclusive substituents; $R_1$ is preferably hydrogen, but it can also be alkyl with maximally four carbon atoms, especially methyl or ethyl, further, phenyl, methylphenyl, methoxyphenyl, chlorophenyl or bromophenyl; $R_2$ in Formulae III and IV is alkyl with maximally four carbon atoms, especially methyl or ethyl; and $R_3$ in the Formulae V and VI is phenyl, alkylphenyl, wherein alkyl is methyl or ethyl, alkoxyphenyl wherein alkoxy is methoxy or ethoxy, chlorophenyl or bromophenyl.

Particularly valuable monoazodyestuffs of the present invention are those of the Formulae IX and X

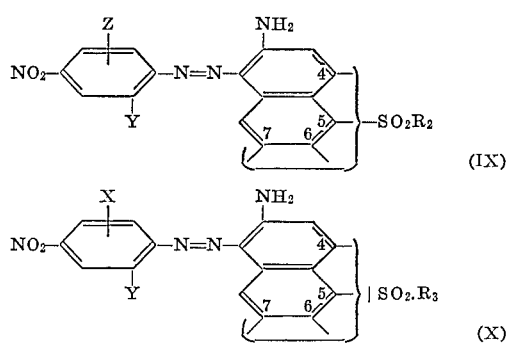

wherein Y is chloro, bromo, cyano or nitro; Z is hydrogen, chloro or bromo; $R_2$ in Formula VII is alkyl with maximally four carbon atoms, especially methyl or ethyl; and $R_3$ in Formula VIII is phenyl, alkylphenyl wherein alkyl is methyl or ethyl, alkoxyphenyl wherein alkoxy is methoxy or ethoxy, chlorophenyl or bromophenyl.

The term "dispersibility-steering substituents" as used in this application stands for the following substituents; alkyl with 1 to 8 carbon atoms, cyclohexyl, benzyl, phenyl, alkoxy having 1 to 4 carbon atoms, and phenoxy substituted in "aryl" which has six ring carbon atoms, and the following acylamino radicals: acetylamino, chloroacetylamine, β - chloropropionylamino, methylsul- fonylamino, chloromethylsulphonylamino, benzoylamino, chlorobenzoylamino, chlorotriazinylamino, chloropyrimidylamino substituted in "aryl" which has six to ten ring carbon atoms.

The term "shade-influencing substituents" as used in this application stands for the following substituents: nitro, trifluoromethyl, cyano, fluoro, bromo, chloro, acetyl, benzoyl, carbalkoxy with maximally 5 carbon atoms, carbocyclohexyloxy, carbophenoxy and carbobenzyloxy substituted in "aryl" which has six ring carbon atoms, and nitro, cyano, bromo and chloro substituted in "aryl" which has 10 ring carbon atoms.

Particularly light-fast dyeings are obtained on polyethyleneglycolterephthalate (Terylene) fibres with the aforesaid dyestuffs in which B is phenyl substituted with 2 to 3 light-fastness improving substituents, which are nitro, cyano, bromo and/or chloro. Best results are obtained with the last mentioned dyestuffs in which B has only two light-fastness improving substituents one of which is a nitro group in p-position to the azo bridge.

Terylene fibres dyed with the last mentioned dyestuffs are distinguished by the following advantages: excellent drawing power, fastness to rubbing, fastness to light and fastness to sublimation.

When dyeing polyhexamethylenediamine adipate, optimal results are obtained with the compounds of Formulae VII and VIII in which the shade-influencing substituents are partially or entirely replaced by one to two of the above mentioned dispersibility-steering substituents.

The following examples illustrate the invention. Where not otherwise expressly stated, parts and percentages are by weight. The temperatures are in degrees centigrade. The relationship of parts by weight to parts by volume is as that of grams to cubic centimeters.

EXAMPLE 20

The diazonium compound of 17.25 parts of 1-amino-2-chloro-4-nitrobenzene is added dropwise at room temperature to a solution of 23.5 parts of 2-aminonaphthalene-6-ethylsulphone and 100 parts of 36% hydrochloric acid in 1500 parts of water and 5 parts of an anion active dispersing agent. The pH of the reaction mixture is then buffered with sodium acetate to 4–4.5. On completion of the coupling, the red precipitate is filtered off under suction, washed with a lot of water and dried at 60–70° in vacuo. The dyestuff so obtained of the formula

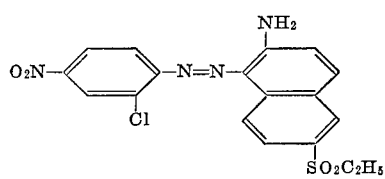

is a brown-red powder which, when milled with an alkylarylbenzene sulphonate, dyes polyester fibers such as "Dacron" in red shades from aqueous dispersion, with or without the addition of carriers. The dyeings have very good fastness to washing and light.

The coupling component used is obtained, for example, by reduction of the 2-acetylaminonaphthalene-6-sulphonic acid chloride with sodium sulphite, alkylation of the sulphinic acid obtained with diethyl sulphate and subsequent saponification of the acetylamino group.

If in the above example, instead of the 17.25 parts of 1-amino-2-chloro-4-nitrobenzene, corresponding amounts of the diazo components given in the following Table IX are used and they are coupled under the conditions given in the above example with one of the coupling components given in column 3, then dyestuffs are obtained which produce polyester dyeing having similarly good properties.

TABLE IX

| No. | Diazo component | Coupling component or mixture of coupling components | Shade on polyester fibres |
|---|---|---|---|
| 1 | 1-amino-2-nitrobenzene | 2-aminonaphthalene-6-methyl sulphone | Scarlet. |
| 2 | do | 2-aminonaphthalene-7-ethyl sulphone | Do. |
| 3 | 1-amino-2-nitro-4-methylbenzene | 2-aminonaphthalene-6-phenyl sulphone | Do. |
| 4 | do | 2-aminonaphthalene-6-ethyl sulphone; 2-aminonaphthalene-6-p-tolyl sulphone | Do. |
| 5 | 1-amino-2-chloro-4-nitrobenzene | 2-aminonaphthalene-7-isopropyl sulphone | Red. |
| 6 | 1-amino-2-cyano-4-nitrobenzene | 2-aminonaphthalene-6-methyl sulphone | Bluish-red. |
| 7 | do | do | Do. |
| 8 | 1-amino-2,6-dichloro-4-nitrobenzene. | 2-aminonaphthalene-7-methylsulphone | Red. |
| 9 | do | 2-aminonaphthalene-6-p-tolylsulphone | Do. |
| 10 | 1-amino-2-cyano-4-nitrobenzene | 2-aminonaphthalene-6-methyl sulphone; 2-aminonaphthalene-6-ethylsulphone | Bluish red. |
| 11 | do | 2-aminonaphthalene-7-butylsulphone | Do. |
| 12 | 1-amino-2,4-dinitro-6-chlorbenzene | 2-aminonaphthalene-6-methylsulphone | Bordeaux. |
| 13 | 1-amino-2-chloro-4-nitro-benzene | 2-aminonaphthalene-7-phenyl-sulphone | Red. |
| 14 | 1-amino-2-bromo-4-nitro-benzene | 2-aminonaphthalene-7-p-tolyl-sulphone | Do. |
| 15 | 1-amino-2-chloro-4-nitro-benzene | 2-aminonaphthalene-6-methyl-sulphone | Do. |
| 16 | 1-amino-2,4-dinitro-benzene | do | Bordeaux. |
| 17 | do | 2-aminonaphthalene-6-ethylsulphone | Do. |

EXAMPLE 21

21.75 parts of 1-amino-2,4-dinitro-6-chlorobenzene are dissolved in 40 parts of concentrated sulphuric acid and diazotized at 20–25° with nitrosyl sulphuric acid corresponding to 6.9 parts of sodium nitrite. The diazonium salt solution so obtained is added dropwise at 0–5° to a solution of 30.1 parts of 2-amino-5-methylsulphonyl-naphthalene-1-sulphonic acid in 200 parts of concentrated sulphuric acid, 1500 parts of water and 5 parts of a fatty alcohol polyglycol ether. The black-violet coupling product of the formula

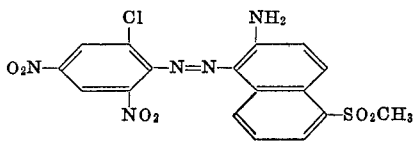

is filtered off, washed neutral with dilute sodium carbonate solution and finally washed free of salt with water. The dry dyestuff is then milled with a dispersing agent. From an aqueous dispersion this dyestuff preparation dyes polyester fibers or cellulose triacetate fibers, with or without the use of carriers, in bordeaux shades. The dyeings are very fast to water, washing and sublimation. The coupling component used is obtained, for example, by reacting sulphuric acid monohydrate with 2-aminonaphthalene-5-methylsulphone in the cold. 2-aminonaphthalene-5-methylsulphone (M.P. 137–138°) is produced, for example, by reduction of the 2-acetylaminonaphthalene-5-sulphonic acid chloride with sodium sulphite, condensation of the sulphinic acid obtained with chloroacetic acid followed by decarboxylation of the carboxymethylsulphonyl group with simultaneous saponification of the acetylamino group.

A dyestuff having equivalent properties is obtained, if in the above example, instead of the 30.1 parts of 2-aminonaphthalene-5-methylsulphonyl-1-sulphonic acid, 31.5 parts of 2-aminonaphthalene-5-ethylsulphonyl-1-sulphonic acid are used and coupling is performed under the conditions given.

EXAMPLE 22

16.3 parts of 1-amino-2-cyano-4-nitrobenzene are dissolved in 80 parts of concentrated sulphuric acid and diazotised at room temperature for 10 hours with nitrosyl sulphuric acid, corresponding to 6.9 parts of sodium nitrite.

The solution of the diazonium compound is added dropwise at 0–5° to a solution of 11.05 parts of 2-amino-naphthalene-5-methylsulphone and 14.85 parts of 2-aminonaphthalene-5-p-tolylsulphone and 100 parts of 36% hydrochloric acid in 1500 parts of water and 10 parts of a dispersing agent. After one hour, the pH of the reaction mixture is buffered to 4–4.5 with sodium acetate.

The violet coupling product mixture obtained of the composition

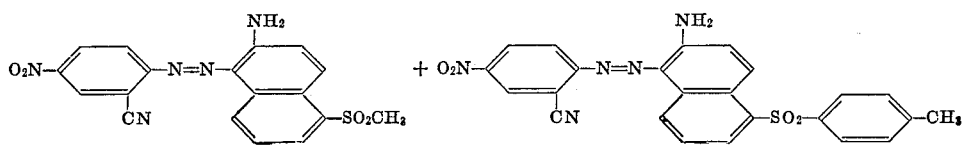

is filtered off, washed neutral and free of salt in the usual way and finally dried at 60–70° under reduced pressure. The dry dyestuff is milled with an alkylbenzene sulphonate; this dyestuff preparation dyes polyester fibres such as 'Tergal' of Rhodiaceta, Lyons, France, in the presence of a carrier in bluish-red shades. The dyeings have very good fastness to washing, perspiration, light and sublimation.

The 2-amino-naphthelene-5-p-tolylsulphone, M.P. 196–197°, used together with the 2-amino-naphthalene-5-methylsulphone as coupling component, is obtained, for example, by reacting 2-acetyl-aminonaphthalene-5-sulphonic acid chloride with toluene in the presence of aluminum chloride followed by saponifying the acetylamino group.

Dyestuffs having similar properties are obtained if equimolecular amounts of the diazo and coupling components given in the following Table X are coupled under the conditions described in Example 3.

TABLE X

| No. | Diazo component | Coupling component or mixture of coupling components | Shade on polyester fibres |
|---|---|---|---|
| 1 | 1-amino-2-nitrobenzene | 2-aminonaphthalene-5-ethylsulphone | Scarlet. |
| 2 | ....do.... | 2-aminonaphthalene-8-methylsulphone | Do. |
| 3 | 1-amino-4-nitrobenzene | 2-aminonaphthalene-5-phenylsulphone | Do. |
| 4 | 1-amino-2-nitro-4-methylbenzene | 2-aminonaphthalene-8-p-tolylsulphone | Do. |
| 5 | 1-amino-2-chloro-4-nitrobenzene | 2-aminonaphthalene-8-isopropylsulphone | Red. |
| 6 | 1-amino-2-nitro-4-chlorobenzene | 2-aminonaphthalene-5-butylsulphone | Do. |
| 7 | ....do.... | 2-aminonaphthalene-5-p-tolylsulphone | Do. |
| 8 | 1-amino-2-nitro-4-trifluoromethyl-benzene. | 2-aminonaphthalene-5-methylbenzene | Do. |
| 9 | 1-amino-2-methoxy-4-nitrobenzene | 2-aminonaphthalene-5-ethylsulphonyl-1-sulphonic acid | Scarlet. |
| 10 | 1-amino-2-nitro-4-methoxybenzene | 2-aminonaphthalene-8-phenylsulphone | Do. |
| 11 | 1-amino-2-cyano-4-nitrobenzene | 2-aminonaphthalene-8-methylsulphone | Red. |
| 12 | 1-amino-2,6-dichloro-4-nitrobenzene. | 2-aminonaphthalene-5-ethylsulphone | Do. |
| 13 | ....do.... | 2-aminonaphthalene-5-isopropylsulphone | Do. |
| 14 | 1-amino-2-chloro-4-nitrobenzene | 2-aminonaphthalene-5-p-tolylsulphone | Do. |
| 15 | 1-amino-2-cyano-4-nitrobenzene | ....do.... | Bluish-red. |
| 16 | ....do.... | 2-aminonaphthalene-5-methylsulphone | Do. |
| 17 | ....do.... | 2-aminonaphthalene-5-ethylsulphone | Do. |
| 18 | 1-amino-2,4-dinitrobenzene | 2-aminonaphthalene-5-methylsulphone | Bordeaux. |
| 19 | ....do.... | 2-aminonaphthalene-5-ethylsulphone | Do. |
| 20 | 1-amino-2,4-dinitro-6-chlorobenzene. | 2-aminonaphthalene-8-methylsulphone | Do. |
| 21 | ....do.... | 2-aminonaphthalene-5-butylsulphone | Do. |
| 22 | 1-amino-2,5-dichloro-4-nitrobenzene. | 2-aminonaphthalene-5-ethylsulphone | Red. |
| 23 | 1-amino-2-bromo-4-nitrobenzene | 2-aminonaphthalene-5-methylsulphone | Do. |
| 24 | ....do.... | 2-aminonaphthalene-5-ethylsulphone | Do. |
| 25 | 1-amino-2-chloro-4-nitrobenzene | ....do.... | Do. |
| 26 | 1-amino-2,4-dinitro-6-bromo-benzene. | 2-aminonaphthalene-5-methylsulphone | Bordeaux. |
| 27 | 1-amino-2,6-dibromo-4-nitrobenzene. | ....do.... | Red. |

EXAMPLE 23

A slurry consisting of 17.3 parts of 1-amino-2-chloro-4-nitro-benzene in 300 parts of water and 30 parts of hydrochloric acid (36%) is diazotized at 0-5° by the dropwise addition of 6.9 parts of sodium nitrite in 50 parts of water. The clear diazonium salt solution is added dropwise at 0-5° to a solution of 22.1 parts of 2-aminonaphthalene-5-methylsulphone in 100 parts acetic acid (80%), 20 parts hydrochloric acid (36%) and 1200 parts of water. After an hour the pH of the reaction mixture is adjusted to a value of 4-4.5.

The red coupling product which precipitates in an easily filterable form is filtered and washed with a lot of water; it corresponds to the formula:

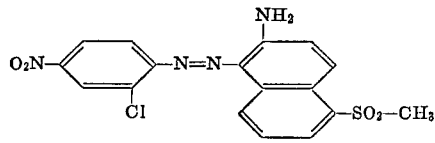

The red dyestuff is dried in vacuo at 60-70° whereupon it is ground with a synthetic dispersing agent. Polyester fibres such as "Dacron" can be dyed in red shades with an aqueous dispersion of the dyestuff, obtained as described above, possibly with the addition of colour carriers. The dyeings are very fast to washing, sublimation and light.

EXAMPLE 24

The diazonium compound resulting from 13.8 parts of 1-amino-2-nitrobenzole is added dropwise at 0-5° to a solution of 23.5 parts of 2-aminonaphthalene-4-ethylsulphone in 100 parts (36%) hydrochloric acid, 1000 parts of water and 5 parts of a fatty alcohol-polyglycol ether. Thereupon the pH of the reaction mixture is adjusted to 4-4.5 with sodium acetate. The precipitated dyestuff having the formula

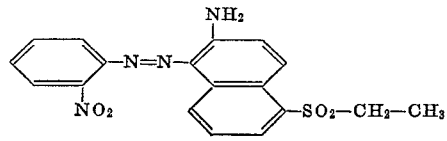

is filtered and washed with a great deal of water, and dried in vacuo at 60°. A red powder is thus obtained. On grinding, the dyestuff with an anion active dispersing agent this product dyes cellulose triacetate fibres in the presence of such colour carriers as o-phenylphenol, in red shades which are fast to light and washing.

The coupling component used above is prepared, for example by reacting 2-acetylaminonaphthalene-4-sulphinic acid with diethyl sulphate and thereupon saponifying the acetylamino group.

If in the above example instead of the 13.8 parts 1-amino - 2 - nitrobenzene equimolecular amounts of the diazo components listed in Table XI are reacted with the coupling components listed in column 3, under the conditions as given above, dyestuffs are obtained having similar dye qualities.

TABLE XI

| No. | Diazo component | Coupling component or mixture of coupling components | Shade on polyester fibres |
|---|---|---|---|
| 1 | 1-amino-2-nitrobenzene | 2-aminonaphthalene-4-p-tolylsulphone | Red. |
| 2 | ....do.... | 2-aminonaphthalene-4-isopropylsulphone | Do. |
| 3 | ....do.... | 2-aminonaphthalene-3-methylsulphone | Scarlet. |
| 4 | 1-amino-2-nitro-4-methylbenzene | 2-aminonaphthalene-3-ethylsulphone | Do. |
| 5 | 1-amino-2-chloro-4-nitrobenzene | 2-aminonaphthalene-4-methylsulphone | Red violet. |
| 6 | ....do.... | 2-aminonaphthalene-3-ethylsulphone | Red. |
| 7 | 1-amino-2-methoxy-4-nitrobenzene | 2-aminonaphthalene-4-phenylsulphone | Red violet. |
| 8 | 1-amino-2-cyano-4-nitrobenzene | 2-aminonaphthalene-4-methylsulphone; 2-aminonaphthalene-4-p-tolylsulphone | Do. |
| 9 | ....do.... | 2-aminonaphthalene-4-butylsulphone | Do. |
| 10 | 1-amino-2,4-dinitrobenzene | 2-aminonaphthalene-4-methylsulphone | Bordeaux. |
| 11 | ....do.... | 2-aminonaphthalene-4-ethylsulphone | Do. |
| 12 | 1-amino-2-bromo-4-nitrobenzene | 2-aminonaphthalene-4-methylsulphone; 2-aminonaphthalene-4-ethylsulphone | Red violet. |

EXAMPLE 25

In a pressure dyeing apparatus, 3 parts of the dyestuff obtained according to Example 1 are finely dispersed in 2000 parts of water containing 5 parts of an anion active synthetic dispersing agent. The pH of the dye bath is adjusted to 6–6.5 with acetic acid.

100 parts of terephthalic acid polyglycol ester fabric are entered at 50°, the bath is heated within 40 minutes to 130–135° and dyeing is performed for 1 hour at this temperature. The dyeing is rinsed with water and soaped. A red dyeing which is fast to perspiration, rubbing, sublimation and light is obtained.

The dyestuffs described in the other examples produce similarly good dyeings when the conditions above described are kept.

EXAMPLE 26

2 parts of the dyestuff obtained according to Example 3 are dispersed in 4000 parts of water. 12 parts of the sodium salt of o-phenylphenol and 12 parts of diammonium phosphate are added to this dispersion and 100 parts of a polyester fabric are dyed for 1½ hours at 95–98°. The dyeing is rinsed and after-treated with dilute caustic soda lye and a dispersing agent.

A bluish-red dyeing is obtained which is fast to washing, rubbing, light and sublimation.

If in this example, the 100 parts of terephthalic acid polyglycol ester fabric are replaced by 100 parts of cellulose triacetate fabric, dyeing is performed under the conditions given and the dyeing is then rinsed with water, then a bluish-red dyeing is produced which has very good fastness to perspiration, rubbing and sublimation.

EXAMPLE 27

Polyglycol terephthalate fabric such as "Dacron" is impregnated in a padding mangle at 40° with an aqueous dispersion composed as follows:

20 parts of the dyestuff obtained according to Example 4, finely dispersed in
7.5 parts of sodium alginate,
20 parts of triethanolamine,
20 parts of a non-ionogenic wetting agent and
900 parts of water.

The fabric is squeezed out to 100% increase of its original weight, dried at 100° and the dye is fixed for 30 seconds at a temperature of 210°. The dyed fabric is rinsed with water, soaped and dried. Under these conditions, a bluish red dyeing is obtained which is fast to washing, rubbing, light and sublimation.

The dyestuffs described in the other examples also produce dyeings of equal quality by this process.

EXAMPLE 28

1.5 parts of the dyestuff obtained according to No. 16 of Table IX are dispersed in 4000 parts of water. To the resulting dispersion there are added:

2 parts of the condensation product of coconut oil fatty acid, dicyanodiamide and p-anisidine (molar ratio 1:1:1) subsequently monosulfonated,
2 parts of the condensation product of 2-naphthalene sulfonic acid and formaldehyde (molar ratio about 1.75:1),
2 parts of ammonium sulfate, and
20 parts of the sodium salt of o-phenylphenol.

100 parts of polyglycol terephthalate fabric are introduced into this bath at 70° C.; the bath is heated up to 100° within 30 minutes and kept for 90 minutes at 100° C. The dyeing is then rinsed and after-treated with aqueous 2%-sodium hydroxide solution and a solution containing 2 grams per liter of p-nonylphenolhexaglycol ether.

Under these conditions, a bordeaux dyeing is obtained which is fast to light and sublimation.

We claim:
1. A non-metallizable monazo dyestuff free from sulfonic acid and carboxylic acid radicals, of the formula

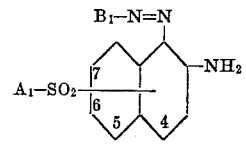

wherein $A_1$ is a member which is linked via the —$SO_2$— bridge to one of the positions 3, 4, 5, 6, 7 and 8 of the naphthalene nucleus, and is selected from the group consisting of
  (a) the amino group;
  (b) a mono-substituted amino group, wherein the substituent is one of the following: alkyl with from 1 to 10 carbon atoms, hydroxy-lower alkyl, lower alkoxy-lower alkyl, lower alkanoyloxy-lower alkyl;
  (c) a disubstituted amino group wherein each substituent is one of the following: alkyl with from 1 to 10 carbon atoms, hydroxy-lower alkyl, lower alkoxy-lower alkyl, lower alkanoyloxy-lower alkyl;
  (d) a substituted amino group wherein one of the amino nitrogen bonds is occupied by one of the following: hydrogen, alkyl with from 1 to 10 carbon atoms, hydroxy-lower alkyl, lower alkoxy-lower alkyl, lower alkanoyloxy-lower alkyl, and another amino nitrogen bond is occupied by one of the following: benzoyloxy-lower alkyl, cycloalkyl with six ring carbon atoms, benzyl, phenyl, lower alkyl-phenyl, lower alkoxy-phenyl, chlorophenyl, bromophenyl;
  (e) phenoxy;
  (f) lower alkyl-phenoxy,
  (g) phenyl-phenoxy,
  (h) lower alkoxy-phenoxy,
  (i) hydroxy-lower alkoxy-phenoxy,
  (j) phenoxy-phenoxy,
  (k) lower alkoxy-carbonyl-phenoxy,
  (l) carbamyl-phenoxy,
  (m) N-carbamylphenoxy substituted at the nitrogen atom with from one to two of the following substituents: lower alkyl, hydroxy-lower alkyl, lower alkoxy-lower alkyl;
  (n) N,N-di-(lower alkyl)-amino-phenoxy,
  (o) lower alkanoyl-amino-phenoxy,
  (p) chloro-phenoxy,
  (q) bromo-phenoxy;
  (r) naphthyl-(1)-oxy,
  (s) naphthyl-(2)-oxy;
  (t) pyridyl-(3)-oxy;
  (u) morpholinyl-(1) and
  (v) piperidyl-(1);
and wherein $B_1$ is a benzene radical substituted by from one to three members selected from the group consisting of chlorine, bromine, nitro, cyano, methyl, methoxy, trifluoromethyl, carboethoxy and carbobutoxy, at least one of which members is nitro or cyano.

2. A dyestuff as defined in claim 1, wherein the grouping $A_1$—$SO_2$— is linked to the 4-, 5- or 6-position of the naphthalene nucleus.

3. A dyestuff as defined in claim 1, wherein the grouping $A_1$—$SO_2$— is linked to one of the positions 5 and 6 of the naphthalene nucleus and wherein $B_1$ is of the formula

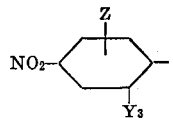

wherein $Y_3$ is selected from among hydrogen, chlorine, bromine, a nitro and cyano, nitro and Z is selected from among hydrogen, chlorine and bromine.

4. A monoazo dyestuff as defined in claim 3, which is of the formula

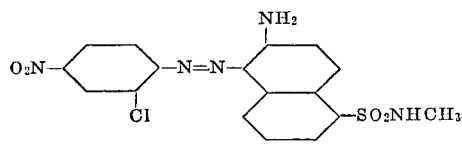

5. A monoazo dyestuff as defined in claim 3, which is of the formula

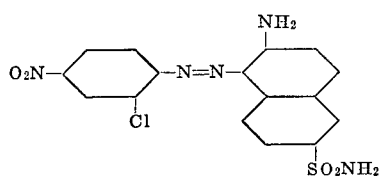

6. A monoazo dyestuff as defined in claim 3, which is of the formula

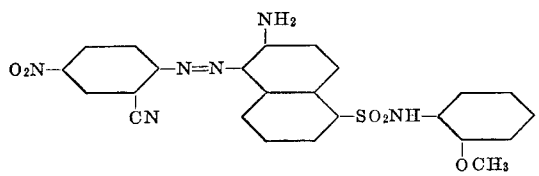

7. A monoazo dyestuff as defined in claim 3, which is of the formula

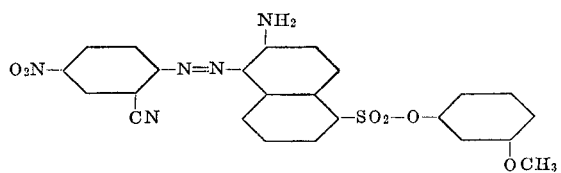

8. A monoazo dyestuff as defined in claim 3, which is of the formula

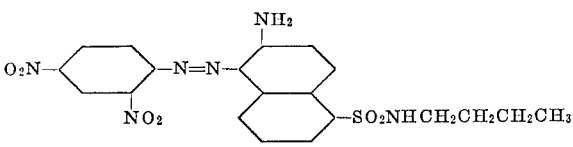

References Cited

UNITED STATES PATENTS 2,776,956  1/1957  Zickendraht et al. ___ 260—196X
2,839,520  6/1958  Neier.

FOREIGN PATENTS 512,378  12/1952  Belgium _____ 260—196

FLOYD D. HIGEL, Primary Examiner

U.S. Cl. X.R.

8—26, 41; 260—152, 153, 154, 156, 157, 158, 162, 194, 247, 456, 465, 509, 543, 556, 578